(12) United States Patent
Ozeki

(10) Patent No.: US 11,679,463 B2
(45) Date of Patent: Jun. 20, 2023

(54) CUTTING FLUID AMOUNT ADJUSTING DEVICE AND SYSTEM

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 706 days.

(21) Appl. No.: 16/787,074

(22) Filed: Feb. 11, 2020

(65) Prior Publication Data
US 2020/0262019 A1   Aug. 20, 2020

(30) Foreign Application Priority Data
Feb. 18, 2019 (JP) ................. 2019-026946

(51) Int. Cl.
*B23Q 11/10* (2006.01)
*G06F 18/214* (2023.01)

(52) U.S. Cl.
CPC ...... *B23Q 11/1038* (2013.01); *G06F 18/2155* (2023.01)

(58) Field of Classification Search
CPC . B23Q 11/1038; B23Q 11/10; B23Q 11/0042; G06K 9/6259; G05B 13/027
See application file for complete search history.

(56) References Cited

U.S. PATENT DOCUMENTS

| | | | |
|---|---|---|---|
| 2017/0270434 A1* | 9/2017 | Takigawa | B23K 26/38 |
| 2017/0357243 A1* | 12/2017 | Takayama | G06N 3/08 |
| 2018/0210406 A1* | 7/2018 | Shimizu | G05B 13/0265 |
| 2018/0267489 A1 | 9/2018 | Tango et al. | |
| 2018/0276570 A1 | 9/2018 | Watanabe | |

FOREIGN PATENT DOCUMENTS

| | | |
|---|---|---|
| JP | 200975737 A | 4/2009 |
| JP | 2013193175 A | 9/2013 |
| JP | 2017113849 A | 6/2017 |
| JP | 2018153872 A | 10/2018 |
| JP | 2018153902 A | 10/2018 |
| WO | WO-2012119723 A2 * | 9/2012 ......... B23Q 11/1038 |

* cited by examiner

*Primary Examiner* — Joseph J Dallo
(74) *Attorney, Agent, or Firm* — Hauptman Ham, LLP

(57) ABSTRACT

A cutting fluid amount adjusting device acquires at least data indicating a machining state of a machine tool and data relating to cutting fluid supplied from a cutting fluid supplying device, creates data used in machine learning based on the acquired data, and executes, based on the created data, processing of the machine learning relating to the discharge amount of the cutting fluid from a cutting fluid nozzle in an environment in which machining of a workpiece by the machine tool is performed.

15 Claims, 16 Drawing Sheets

CUTTING FLUID AMOUNT ADJUSTING DEVICE AND SYSTEM

RELATED APPLICATIONS

The present application claims priority to Japanese Patent Application Number 2019-026946 filed on Feb. 18, 2019, the disclosure of which is hereby incorporated by reference herein in its entirety.

BACKGROUND OF THE INVENTION

1. Field of the Invention

The present invention relates to a cutting fluid amount adjusting device and a cutting fluid amount adjusting system.

2. Description of the Related Art

A machine tool including at least one cutting fluid nozzle sprays water-soluble or water-insoluble cutting fluid on a workpiece during cutting or the like of the workpiece for improvement of lubricity of a tool, cooling of the tool and the workpiece, cleaning of chips, and the like. An amount of the cutting fluid used during machining of the workpiece by the machine tool varies depending on machining conditions and specifications, the nature of the cutting fluid, an environmental temperature, and the like. Therefore, an operator sets, based on experiences, an appropriate discharge amount of the cutting fluid per unit time used during the workpiece machining.

Usually, the discharge amount per unit time of the cutting fluid set by the operator is not changed during the machining of the workpiece. Therefore, for example, a predetermined amount of the cutting fluid is also discharged from a nozzle for discharging the cutting fluid to a position where the cutting fluid is not sprayed on the workpiece. This causes deterioration in efficiency of use of the cutting fluid. As measures against such a problem, Japanese Patent Laid-Open No. 2017-113849 discloses an art for adjusting, based on discharge ranges of cutting fluid from nozzles and the shape of a workpiece, amounts of the cutting fluid discharged from the respective nozzles.

However, cutting heat generated during machining of the workpiece varies depending on a type of a tool, machining conditions, a purpose of the machining (rough machining or finish machining), the material of the workpiece and the like. Therefore, unless these are considered, it is difficult to adjust the discharge amount of the cutting fluid to a discharge amount appropriate for cooling of the tool and the workpiece.

As the cutting fluid, there are various kinds of cutting fluid such as water-soluble cutting fluid, water-insoluble cutting fluid and cutting fluid having different viscosity. A cooling effect and a lubrication effect vary depending on a type of the cutting fluid. The cooling effect varies depending on the temperature of the cutting fluid as well. Therefore, the operator or the machine tool needs to adjust the amounts of the cutting fluid discharged from the nozzles taking these various conditions into consideration.

SUMMARY OF THE INVENTION

Therefore, an object of the present invention is to provide a cutting fluid amount adjusting device and a cutting fluid amount adjusting system capable of adjusting a discharge amount of a cutting fluid to an appropriate discharge amount in consideration of cutting heat generated by machining of a workpiece, a type of the cutting fluid, the temperature of the cutting fluid, and the like.

The present invention provides a cutting fluid amount adjusting device for adjusting a discharge amount of cutting fluid from at least one cutting fluid nozzle included in a cutting fluid supplying device for supplying the cutting fluid to a machining region of a machine tool for machining a workpiece. The cutting fluid amount adjusting device includes: a data acquirer configured to acquire at least data indicating a machining state by the machine tool and data relating to the cutting fluid supplied from the cutting fluid supplying device; a preprocessor configured to create, based on the data acquired by the data acquirer, data used in machine learning; and a machine learning device configured to execute, based on the data created by the preprocessor, processing of the machine learning relating to the discharge amount of the cutting fluid from the cutting fluid nozzle under an environment in which machining of the workpiece by the machine tool is performed.

Alternatively, the present invention provides a cutting fluid amount adjusting system in which a plurality of devices are connected to one another via a network, the plurality of devices having a cutting fluid amount adjusting device including at least a learner.

According to an aspect of the present invention, it is possible to adjust an appropriate discharge amount of cutting fluid in consideration of cutting heat generated by machining of a workpiece, a type of the cutting fluid, the temperature of the cutting fluid and the like.

BRIEF DESCRIPTION OF THE DRAWINGS

The above mentioned and other objects and characteristics of the present invention will be made clear from the following description of embodiments made with reference to the accompanying drawings.

DETAILED DESCRIPTION OF THE PREFERRED EMBODIMENTS

Some embodiments of the present invention will be described below with reference to the drawings.

Figure 1:
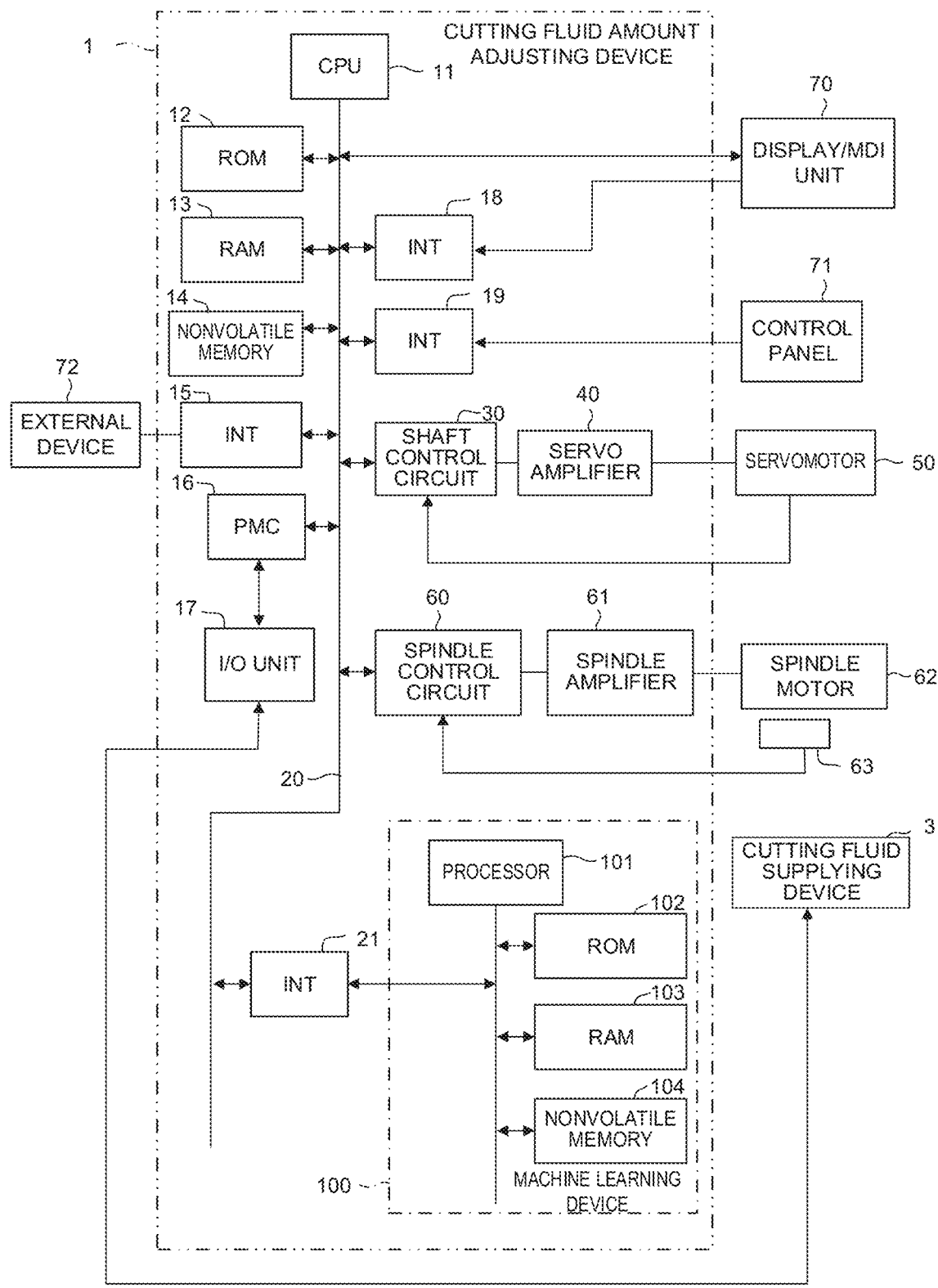
FIG. 1 is a schematic hardware configuration diagram of a cutting fluid amount adjusting device according to an embodiment of the present invention.

FIG. 1 is a schematic hardware configuration diagram showing a main part of a cutting fluid amount adjusting device including a machine learning device according to an embodiment. A cutting fluid amount adjusting device 1 in this embodiment can be mounted on, for example, a control device for controlling a machine tool. The adjusting device 1 in this embodiment can be mounted as computers such as a personal computer provided together with a control device for controlling a machine tool, a managing device connected to the control device via a wired or wireless network, an edge computer, a fog computer and a cloud server. This embodiment exemplifies that the cutting fluid amount adjusting device 1 is mounted on the control device for controlling the machine tool.

The cutting fluid amount adjusting device 1 includes a CPU (Central Processing Unit) 11, a ROM (Read Only Memory) 12, a RAM (Random Access Memory) 13 and a nonvolatile memory 14. The cutting fluid amount adjusting device 1 further includes an interface 15, a PMC (programmable machine controller) 16, an I/O unit (Input/Output unit) 17 and interfaces 18, 19 and 21. The adjusting device 1 is connected to, via the I/O unit 17, a cutting fluid supplying device 3 for supplying cutting fluid. The adjusting device 1 further includes a servomotor 50, a spindle motor 62, a display/MDI (Manual Data Input) unit 70 and a control panel 71.

The CPU 11 included in the cutting fluid amount adjusting device 1 according to this embodiment is a processor for controlling the adjusting device 1 as a whole. The CPU 11 reads out a system program stored in the ROM 12 via a bus 20 and controls the entire cutting fluid amount adjusting device 1 according to the system program. Temporary calculation data and display data, various data, which are input by an operator via a not-shown input unit and the like are temporarily stored in the RAM 13.

The nonvolatile memory 14 is, for example, backed up by a not-shown battery to be configured as a memory in which a stored state is retained even if the cutting fluid amount adjusting device 1 is turned off.

The nonvolatile memory 14 stores a program read from an external device 72 via the interface (INT) 15, a program which is input via the display/MDI unit 70 and various data which are acquired from components of the cutting fluid amount adjusting device 1, the machine tool, the cutting fluid supplying device 3 and the like. The various data stored in the nonvolatile memory 14 include, for example, information concerning: tools such as types of the tools, cutting conditions such as spindle speed, feed speed and cutting depth, machining processes such as rough machining and finish machining, a workpiece such as a workpiece material and a workpiece shape, cutting fluid such as a type and temperature of the cutting fluid, discharge ranges of nozzles, and a discharge amount of the cutting fluid.

The programs and the various data stored in the nonvolatile memory 14 may be evolved on the RAM 13 during execution or use. Various system programs such as a known analysis program are written in the ROM 12 in advance. The system programs written in the ROM 12 in advance include a system program for controlling exchange with a machine learning device 100 described below.

The interface 15 is an interface for connecting the cutting fluid amount adjusting device 1 to the external device 72 such as an adapter. Programs, various parameters and the like are read into the adjusting device 1 from the external device 72 via the interface 15. The programs, the various parameters, and the like edited in the adjusting device 1 can be stored via the external device 72 in an external storage. The PMC 16 performs and controls, via the I/O unit 17, input and output of signals between the PMC 16 and the machine tool and peripheral devices of the machine tool such as the cutting fluid supplying device 3, according to a sequence program incorporated in the adjusting device 1.

The cutting fluid supplying device 3 is a device capable of supplying the cutting fluid to a machining range of the machine tool. The supplying device 3 includes a tank for storing the cutting fluid, a pump for supplying the cutting fluid from the tank via a cutting fluid supply path and one or more cutting fluid nozzles, which are connected to the cutting fluid supply path to discharge the cutting fluid to the machining range of the machine tool. The cutting fluid amount adjusting device 1 adjusts, via a signal output from the PMC 16, discharge amounts of the cutting fluid discharged from the respective cutting fluid nozzles. The cutting fluid supplying device 3 passes, via the PMC 16, amounts of the cutting fluid discharged from the respective cutting fluid nozzles to the CPU 11.

The display/MDI unit 70 is a manual data input device including a display, a keyboard, and the like. The interface (INT) 18 receives a command and data from the keyboard in the display/MDI unit 70 and passes the command and the data to the CPU 11. The interface (INT) 19 is connected to the control panel 71 including a manual pulse generator used in manually driving shafts and the like.

The cutting fluid amount adjusting device 1 further includes a shaft control circuit 30 for controlling shafts of the machine tool and a servo amplifier 40 provided for driving of the servomotor 50. The shaft control circuit 30 receives a movement amount command for the shafts from the CPU 11 and then outputs a command for the shafts to the servo amplifier 40. The servo amplifier 40 receives the command and then drives the servomotor 50 capable of moving the shafts included in the machine tool. The servomotor 50 for the shafts incorporates a position/speed detector. The servomotor 50 feeds back, to the shaft control circuit 30, a position/speed feedback signal from the position/speed detector and then performs feedback control of a position and speed.

In the hardware configuration diagram of FIG. 1, only one shaft control circuit 30, one servo amplifier 40 and one servomotor 50 are shown. However, actually, the shaft control circuit 30, the servo amplifier 40 and the servomotor 50 are prepared by the number of the shafts included in a control target machine tool. For example, in a machine tool including linear three shafts, three shaft control circuits 30, three servo amplifiers 40 and three servomotors 50 are prepared in the cutting fluid amount adjusting device 1. In a five-shaft machine, five shaft control circuits 30, five servo amplifiers 40 and five servomotors 50 are prepared in the adjusting device 1.

The cutting fluid amount adjusting device 1 further includes a spindle control circuit 60 and a spindle amplifier 61 provided for rotation of the spindle motor 62. The spindle control circuit 60 receives a spindle rotation command to a spindle of the machine tool and then outputs a spindle speed signal to the spindle amplifier 61. The spindle amplifier 61 receives the spindle speed signal, rotates the spindle motor 62 for the spindle at commanded rotating speed and drives a tool. The spindle motor 62 is combined with a position coder 63. The position coder 63 outputs a feedback pulse in synchronization with rotation of the spindle. The feedback pulse is read by the CPU 11.

The cutting fluid amount adjusting device 1 includes a machine learning device 100. The interface (INT) 21 in the adjusting device 1 is an interface for connecting the adjusting device 1 with the machine learning device 100. The machine learning device 100 includes a processor 101 for controlling the entire machine learning device 100, a ROM 102 having a system program and the like stored therein, a RAM 103 for performing temporary storage in processing relating to machine learning and a nonvolatile memory 104 used in storage of a learning model and the like.

The machine learning device 100 can observe information capable of being acquired by the cutting fluid amount adjusting device 1 via the interface 21. The information that can be observed by the machine learning device 100 includes, for example, information concerning tools such as types of the tools, information concerning cutting conditions such as spindle speed, feed speed, and cutting depth, information concerning machining processes such as rough machining and finish machining, information concerning a workpiece such as a workpiece material and a workpiece shape, information concerning cutting fluid such as a type and temperature of the cutting fluid, information concerning discharge ranges of nozzles and information concerning a discharge amount of the cutting fluid. The adjusting device 1 receives the information that is output from the machine learning device 100 and then performs processing operations such as control of the machine tool and a cutting fluid discharging device, display on the display/MDI unit 70 and transmission of the information to other devices via a not-shown network.

Figure 2:
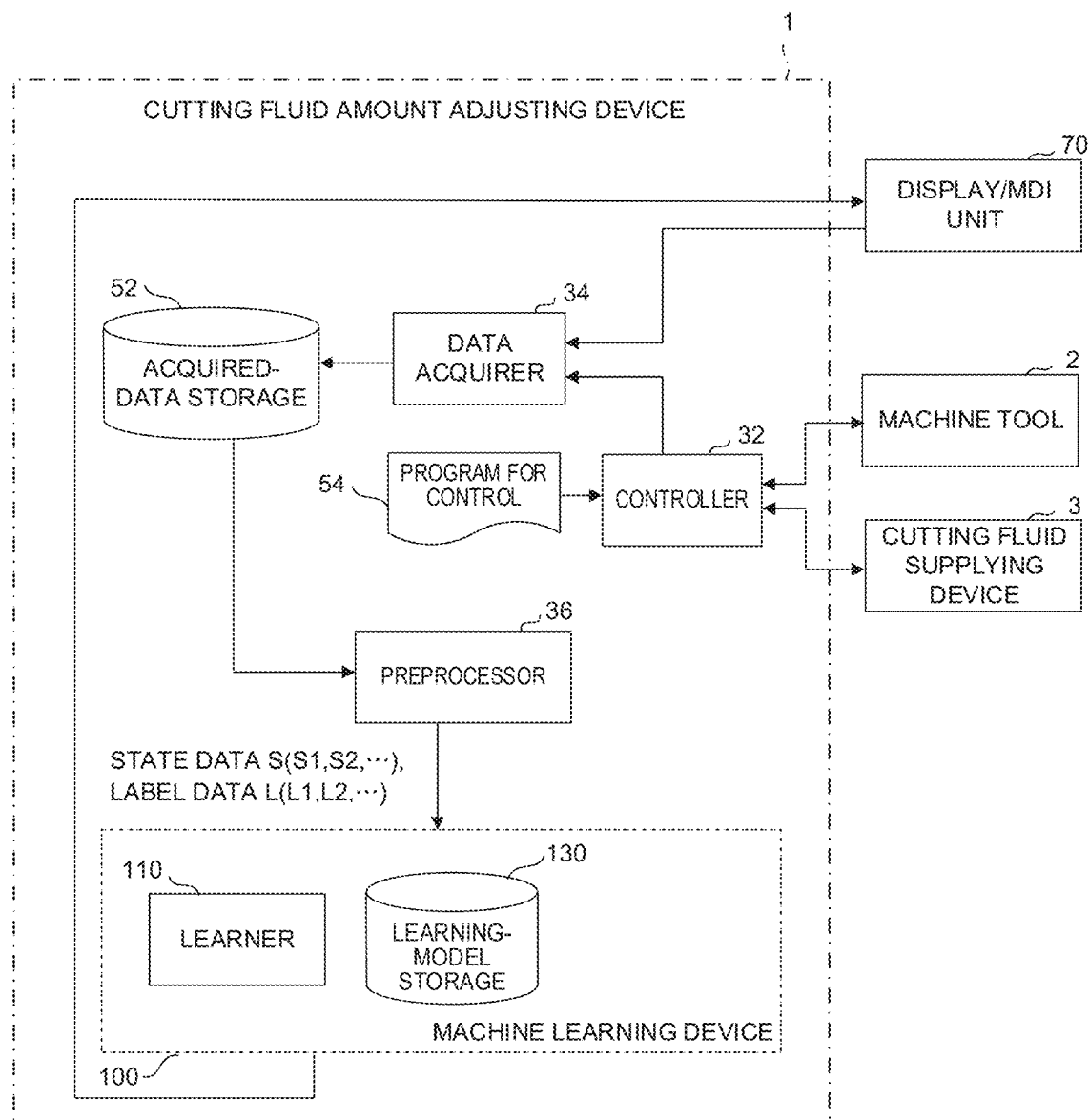
FIG. 2 is a schematic functional block diagram of a control device according to a first embodiment of the present invention.

FIG. 2 is a schematic functional block diagram of the cutting fluid amount adjusting device 1 according to the first embodiment and the machine learning device 100 therein. The adjusting device 1 in this embodiment includes components required when the machine learning device 100 performs supervised learning (a learning mode). Functional blocks shown in FIG. 2 are actualized by the CPU 11 included in the adjusting device 1 and the processor 101 in the machine learning device 100 shown in FIG. 1 executing the respective system programs thereof and controlling the operations of components of the adjusting device 1 and the machine learning device 100.

The cutting fluid amount adjusting device 1 in this embodiment includes a controller 32, a data acquirer 34, and a preprocessor 36. The machine learning device 100 included in the adjusting device 1 includes a learner 110.

The nonvolatile memory 14 shown in FIG. 1 includes an acquired-data storage 52 for storing data acquired from a machine tool 2, the cutting fluid supplying device 3 and the like. The nonvolatile memory 104 in the machine learning device 100 shown in FIG. 1 includes a learning-model storage 130 for storing a learning model constructed by machine learning by the learner 110.

The controller 32 executes the system program read out from the ROM 12 by the CPU 11 included in the cutting fluid amount adjusting device 1 shown in FIG. 1. The controller 32 is actualized by mainly performing arithmetic processing using the RAM 13 and the nonvolatile memory 14 by the CPU 11 and control processing for the machine tool 2 and the cutting fluid supplying device 3 via the shaft control circuit 30, the spindle control circuit 60 and the PMC 16. The controller 32 is functional means for controlling the operation of the machine tool 2 and the cutting fluid supplying device 3 based on a program 54 for control stored in the nonvolatile memory 14 shown in FIG. 1.

The controller 32 includes a function for general control required to control components of the machine tool 2, for example, for outputting a movement command at every control cycle to the servomotor 50 (FIG. 1) and the spindle motor (FIG. 1) for driving shafts included in the machine tool 2 according to the program 54 for control. The controller 32 outputs, to the cutting fluid supplying device 3, a command for adjusting amounts of the cutting fluid discharged from the respective cutting fluid nozzles.

Furthermore, the controller 32 receives, from the machine tool 2 and the cutting fluid supplying device 3, information concerning a machining state by the machine tool 2 and a state of the cutting fluid supplied from the cutting fluid supplying device 3 and then outputs these information to the data acquirer 34. Data that the controller 32 acquires from the machine tool 2 and the supplying device 3 and outputs to the data acquirer 34 include, for instance, information concerning tools such as types of the tools, information concerning cutting conditions such as spindle speed, feed speed and cutting depth, information concerning machining processes such as rough machining and finish machining, information concerning a workpiece such as a workpiece material and a workpiece shape, information concerning cutting fluid such as a type and temperature of the cutting fluid, information concerning discharge ranges of nozzles and information concerning a discharge amount of the cutting fluid.

The data acquirer 34 executes the system program read out from the ROM 12 by the CPU 11 included in the cutting fluid amount adjusting device 1 shown in FIG. 1. The data acquirer 34 is actualized by the CPU 11 mainly performing the arithmetic processing using the RAM 13 and the nonvolatile memory 14. The data acquirer 34 is regarded as function means for storing, in the acquired-data storage 52, data relating to a machining state by the machine tool 2 input from the controller 32, data relating to a state of the cutting fluid supplied from the cutting fluid supplying device 3, and data relating to evaluation for a cutting fluid amount input from the display/MDI unit 70 by the operator, for example.

The data acquirer 34 associates the data relating to the machining state by the machine tool 2 input from the controller 32 and the data relating to the state of the cutting fluid supplied from the cutting fluid supplying device 3 with the data relating to the evaluation for the cutting fluid amount discharged from the cutting fluid nozzles. The data acquirer 34 stores the above-mentioned data associated with each other in the acquired-data storage 52 as acquired data.

The preprocessor 36 executes the system program read out from the ROM 12 by the CPU 11 included in the cutting fluid amount adjusting device 1 shown in FIG. 1. The preprocessor 36 is actualized by the CPU 11 mainly performing the arithmetic processing using the RAM 13 and the nonvolatile memory 14. The preprocessor 36 is regarded as functional means for creating, based on the data acquired by the data acquirer 34, learning data used in machine learning by the machine learning device 100.

The preprocessor 36 creates learning data obtained by converting (digitizing, sampling or the like) the data acquired by the data acquirer 34 (and stored in the acquired-data storage 52) into a unified form treated in the machine learning device 100. For example, when the machine learning device 100 performs supervised learning, the preprocessor 36 creates, as the learning data, a set of state data S and label data L of a predetermined form in the learning.

The state data S created by the preprocessor 36 in this embodiment includes at least the following seven kinds of data S1 to S7. More specifically, the state data S contains at least tool data S1 including information concerning tools used in machining of a workpiece by the machine tool 2, machining condition data S2 including information concerning machining conditions in the machining of the workpiece by the machine tool 2, workpiece data S3 including information concerning the workpiece machined by the machine tool 2, cutting fluid data S4 including information concerning the cutting fluid supplied to a machining region of the machine tool 2 by the cutting fluid supplying device 3, machining process data S5 including information concerning a machining process for the workpiece by the machine tool 2, cutting fluid discharge position data S6 including information concerning discharge positions of the cutting fluid by the cutting fluid nozzles included in the supplying device 3 and cutting fluid discharge amount data S7 including an amount of the cutting fluid discharged from the cutting fluid nozzles included in the supplying device 3.

The tool data S1 is defined as a data row indicating types and materials of the tools used in the machining of the workpiece by the machine tool 2. Concerning the types of the tools, for example, the tools may be classified according to shapes and methods of use during machining of the tools such as a cutting tool, a milling cutter tool, and a drill tool and respectively represented by uniquely identifiable numerical values. Concerning the materials of the tools, for example, tool materials such as high-speed steel and hard metal may be respectively represented by uniquely identifiable numerical values. Information concerning the tools set for the cutting fluid amount adjusting device 1 and the machine tool 2 by the operator may be acquired. The tool data S1 may be created based on the acquired information concerning the tools.

The machining condition data S2 is defined as a data row including, as elements, machining conditions such as spindle speed, feed speed and cutting depth set or commanded in the machining of the workpiece by the machine tool 2. Concerning these machining conditions, numerical values indicating values of the respective machining conditions in predetermined units can be used. The values of the respective machining conditions may be commanded by the program 54 for control or set as default values for control. Therefore, the values of the respective machining conditions may be created by acquiring the program 54 for control or the default values for control.

The workpiece data S3 is defined as a data row indicating the material of the workpiece machined by the machine tool 2 and the shape of the workpiece being machined. Concerning the material of the workpiece, for example, workpiece materials such as aluminum and iron may be respectively represented by uniquely identifiable numerical values. Concerning the shape of the workpiece being machined, for example, as shown in FIG. 3, a table included in the machine tool 2 may be divided into predetermined areas and the shape of the workpiece may be represented as a data row indicating heights in the areas (average values of the heights in the areas) of the workpiece placed on the table.

Figure 3:
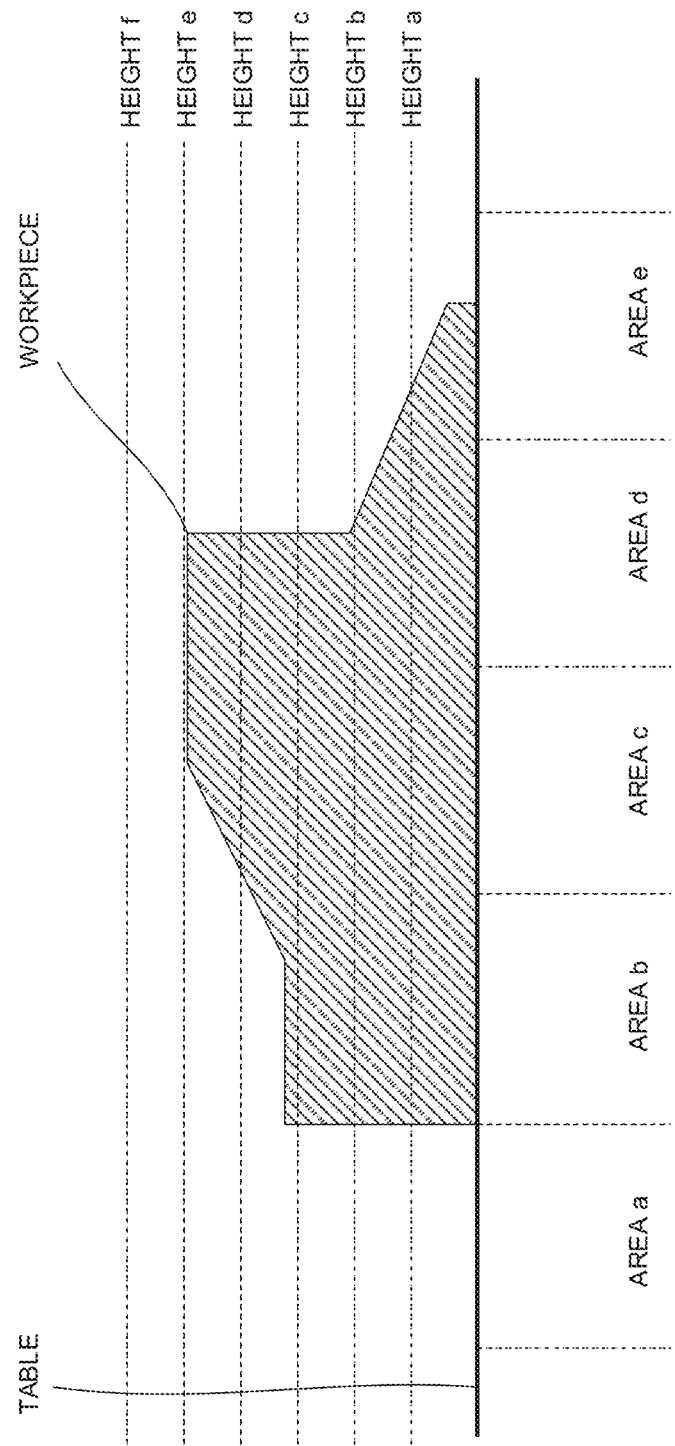
FIG. 3 is a diagram for illustrating state data relating to a workpiece.

In an embodiment shown in FIG. 3, in order to simplify explanation, the table is viewed from a side and divided into a laterally arranged plurality of areas. However, actually, a two-dimensional plane of a table upper surface may be divided into a plurality of rectangular areas and the shape of the workpiece may be indicated as a data row indicating heights of the workpiece in the respective rectangular areas. The workpiece data S3 may be created based on information concerning the workpiece set for the cutting fluid amount adjusting device 1 and the machine tool 2 by the operator, the shape of the workpiece measured before a machining start, data acquired from a CAD (Computer Aided Design) or CAM (Computer Aided Manufacturing) device and data relating to a machining progress obtained by analyzing the program 54 for control, for instance.

The cutting fluid data S4 is defined as a data row indicating a type of the cutting fluid discharged to the machining region of the machine tool 2 and the temperature of the cutting fluid. Concerning the type of the cutting fluid, for example, types of cutting fluids such as a water-soluble A1 type and a water-insoluble N1 type may be respectively represented by uniquely identifiable numerical values. Concerning the temperature of the cutting fluid, a numerical value indicating a temperature value of the cutting fluid in predetermined unit may be used. Information concerning the cutting fluid set for the cutting fluid amount adjusting device 1 and the machine tool 2 by the operator, a value detected by a sensor or the like included in the cutting fluid supplying device 3 may be acquired to create the cutting fluid data S4 on the basis of the acquired information concerning this cutting fluid.

The machining process data S5 is defined as data indicating a process of the machining of the workpiece by the machine tool 2. Concerning the process of the machining, for example, machining processes such as rough machining, intermediate finish machining and finish machining may be respectively represented by uniquely identifiable numerical values. The machining process data S5 may be created based on data acquired from the CAD/CAM device before the machining start, data relating to the machining process obtained by analyzing the program 54 for control, and the like.

The cutting fluid discharge position data S6 is defined as a data row indicating discharge positions of the cutting fluid by the respective cutting fluid nozzles included in the cutting fluid supplying device 3. For example, as shown in FIG. 4, the discharge positions of the cutting fluid by the cutting fluid nozzles may be represented as a data row indicating on which of predetermined divided areas of the table included in the machine tool 2 the cutting fluid discharged from the cutting fluid nozzles is spayed.

Figure 4:
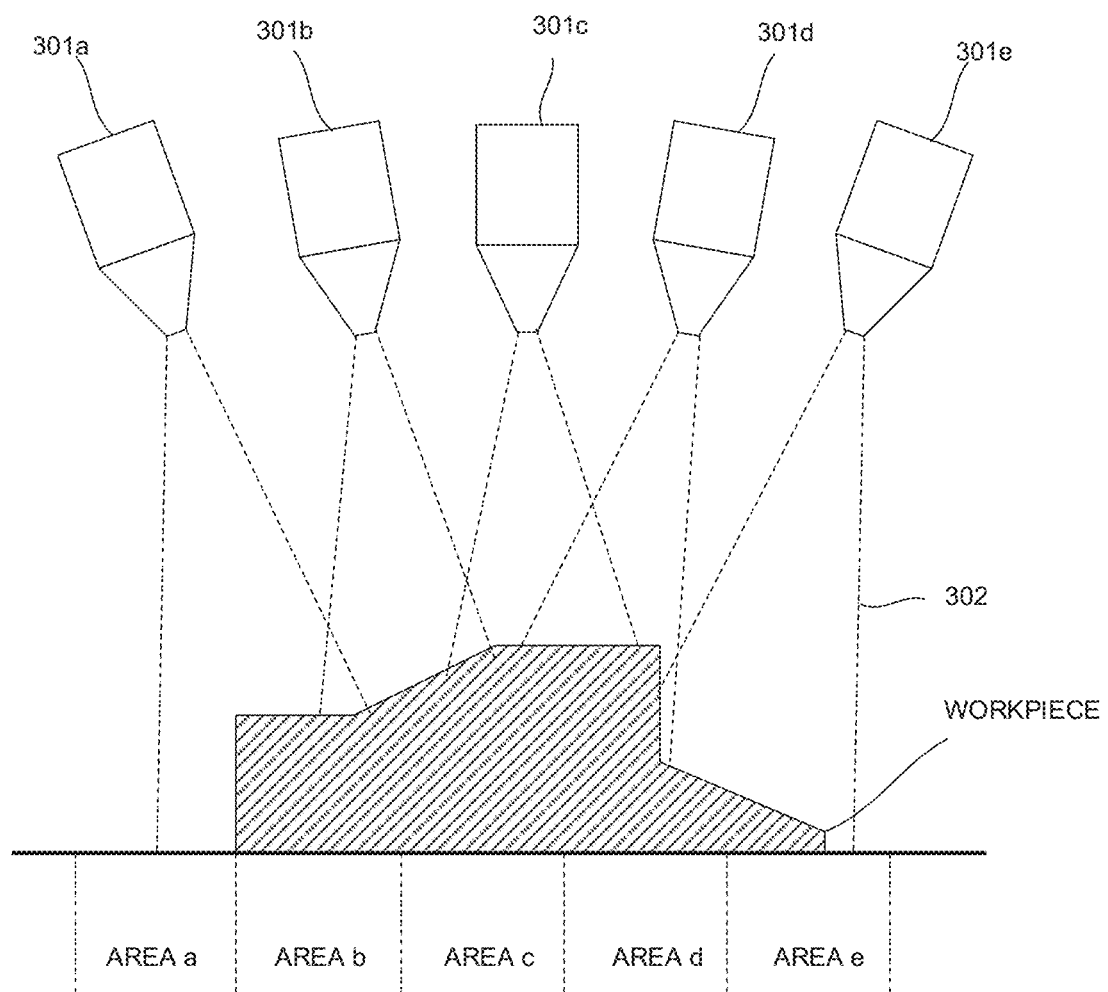
FIG. 4 is a diagram for illustrating state data relating to a cutting fluid nozzle.

In the embodiment shown in FIG. 4, a cutting fluid nozzle 301a discharges cutting fluid 302 to areas a and b. Therefore, the cutting fluid discharge position data S6 concerning the cutting fluid nozzle 301a may be represented as (1, 1, 0, 0, 0), where numeral 1 indicates that the cutting fluid 302 is sprayed on the areas and numeral 0 indicates that the cutting fluid 302 is not sprayed on the areas. In the embodiment shown in FIG. 4, in order to simplify explanation, the table is viewed from a side and is divided into a laterally arranged plurality of areas. However, actually, a two-dimensional plane of a table upper surface may be divided into a plurality of rectangular areas and discharge positions of the cutting fluid 302 may be indicated as a data row indicating whether or not the cutting fluid 302 is sprayed on the respective rectangular areas. The operator may set the cutting fluid discharge position data S6 from the display/MDI unit 70 in advance according to the disposition of the cutting fluid nozzles.

The cutting fluid discharge amount data S7 is defined as data indicating amounts of the cutting fluid discharged from the respective cutting fluid nozzles included in the cutting fluid supplying device 3. The amounts of the cutting fluid discharged from the cutting fluid nozzles may be discharge amounts of the cutting fluid per unit time represented by numerical values in predetermined unit. Alternatively, for example, the amounts of the cutting fluid discharged from the cutting fluid nozzles may be represented by numerical values indicated by a plurality of stages (for example, ten stages). The cutting fluid discharge amount data S7 may be created based on discharge amounts of the cutting fluid in the cutting fluid nozzles acquired from the supplying device 3.

The label data L created by the preprocessor 36 includes at least discharge amount propriety data L1, which is data relating to evaluation indicating whether or not discharge amounts of the cutting fluid discharged from the respective cutting fluid nozzles are sufficient in a machining state in which the above-mentioned state data S is acquired.

The discharge amount propriety data L1 is defined as, concerning each of the cutting fluid nozzles, data that takes a label value relating to evaluation indicating whether or not the discharge amount of the cutting fluid is sufficient. As an example, the operator, who is observing a machining state of the workpiece by the machine tool 2, may create the discharge amount propriety data L1 based on input operation performed using the display/MDI unit 70. As the creation based on the input operation of the operator, the operator may directly input whether or not the discharge amounts of the cutting fluid are sufficient for the respective cutting fluid nozzles. Alternatively, the operator may adjust an amount of the cutting fluid discharged from any one of the cutting fluid nozzles and, when the similar machining state continues for a predetermined time in that state, about the cutting fluid nozzle, the discharge amount of which is adjusted, create the discharge amount propriety data L1 considering that the amount of the cutting fluid after the adjustment is a sufficient amount. For example, temperatures of portions of the workpiece may be measured using a temperature sensor such as a thermography attached to the machine tool 2. The discharge amount propriety data L1 may be created based on the result of this measurement.

In the embodiment shown in FIG. 4, when temperatures of the workpiece in areas a-e are measured and the temperature does not sufficiently drop in the position of the area c, a label value indicating that discharge amounts are insufficient concerning cutting fluid nozzles 301b, 301c and 301d may be created. All the cutting fluid nozzles 301b, 301c, and 301d in this case are cutting fluid nozzles that are spraying the cutting fluid 302 on the area c. Further, for example, the discharge amount propriety data L1 may be created using a visual sensor, a distance sensor or the like attached to the machine tool 2, based on whether or not chips are sufficiently removed from portions of the workpiece.

The learner 110 executes the system program read out from the ROM 102 by the processor 101 included in the cutting fluid amount adjusting device 1 shown in FIG. 1. The learner 110 is actualized by the processor 101 mainly performing arithmetic processing using the RAM 103 and the nonvolatile memory 104. The learner 110 in this embodiment performs machine learning using learning data created by the preprocessor 36. The learner 110 generates, with a publicly-known method of supervised learning, a learning model that has learned evaluation of discharge amounts of the cutting fluid discharged from the cutting fluid nozzles with respect to a machining state by the machine tool 2 and a supply state of the cutting fluid by the cutting fluid supplying device 3. Furthermore, the learner 110 stores the generated learning model in the learning-model storage 130.

The method of supervised learning performed by the learner 110 includes, for example, a multilayer perceptron method, a recurrent neural network method, a Long Short-Term Memory method and a convolutional neural network method.

The learner 110 in this embodiment generates, about the respective cutting fluid nozzles, learning models that have associated the evaluation of the discharge amounts of the cutting fluid discharged from the cutting fluid nozzles with the machining state by the machine tool 2 and the state of the cutting fluid supplied from the cutting fluid supplying device 3 and then have learned the associated matter. For example, when there are five cutting fluid nozzles as shown in FIG. 4, the learner 110 generates five learning models that have learned discharge amounts of the respective cutting fluid nozzles.

Figure 5:
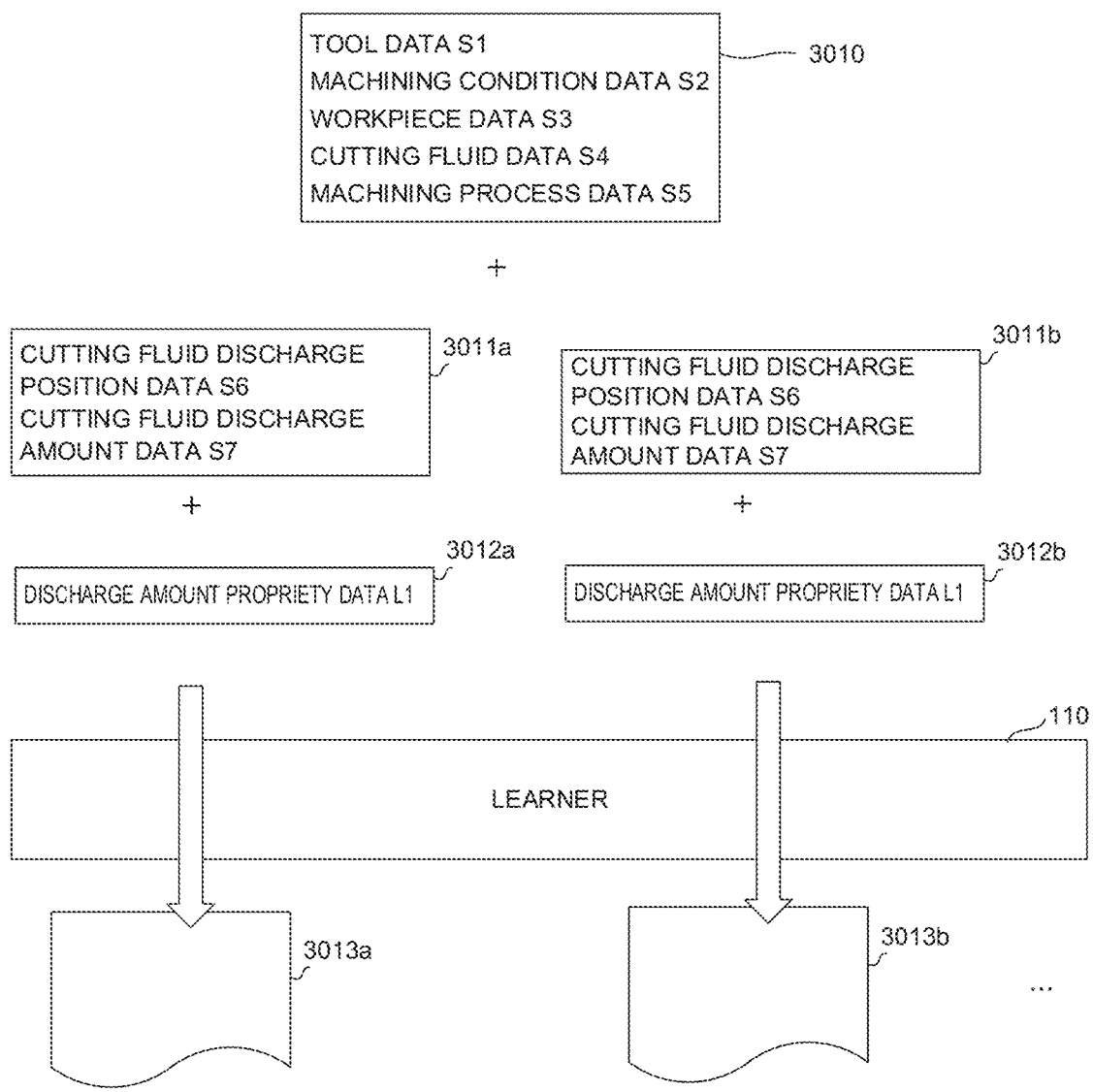
FIG. 5 is a diagram for illustrating an operation of a learner according to the first embodiment.

FIG. 5 is a diagram showing an overview in which the learner 110 creates a learning model for each of the cutting fluid nozzles using the state data S and the label data L. As shown in FIG. 5, in the state data S, the tool data S1, the machining condition data S2, the workpiece data S3, the cutting fluid data S4 and the machining process data S5 can be used in common among a plurality of cutting fluid nozzles. In FIG. 5, state data common to the above-mentioned cutting fluid nozzles is indicated by reference numeral 3010.

The learner 110 adds the cutting fluid discharge position data S6, the cutting fluid discharge amount data S7 and the discharge amount data L1 created for each of the cutting fluid nozzles to these state data and then generates learning models for the respective cutting fluid nozzles that use these data. In FIG. 5, state data (the data S6 and S7) characteristic of the cutting fluid nozzles 301a and 301b are respectively indicated by reference numerals 3011a and 3011b. Label data (the discharge amount propriety data L1) of the cutting fluid nozzles 301a and 301b are respectively indicated by reference signs 3012a and 3012b. Furthermore, learning models for the cutting fluid nozzles 301a and 301b are respectively indicated by reference signs 3013a and 3013b.

The learning model generated by the learner 110 in this embodiment in this way estimates, about the respective cutting fluid nozzles, when the machining state by the machine tool 2 and the state of the cutting fluid supplied from the cutting fluid supplying device 3 are given, whether or not discharge amounts of the cutting fluid discharged from the cutting fluid nozzles in such states are sufficient.

The learner 110 is an essential component in a learning stage. However, the learner 110 is not always the essential component after the learning of the evaluation of the discharge amounts of the cutting fluid discharged from the cutting fluid nozzles by the learner 110 is completed. For example, when the machine learning device 100, for which the learning is completed, is shipped to a customer, the machine learning device 100 may be shipped after the learner 110 is removed.

The cutting fluid amount adjusting device 1 according to this embodiment including the configuration described above generates, about the respective cutting fluid nozzles, learning models that have associated the evaluation of the discharge amounts of the cutting fluid discharged from the cutting fluid nozzles with the machining state by the machine tool 2 and the state of the cutting fluid supplied from the cutting fluid supplying device 3 and have learned the associated matter. Using the learning models generated in this way, an estimator 120 described below can perform estimation processing required for determining, based on the state data S acquired from the machine tool 2 and the supplying device 3, more appropriate amounts of the cutting fluid discharged from the cutting fluid nozzles in the acquired state.

As an alternative embodiment of the cutting fluid amount adjusting device 1 according to this embodiment, the preprocessor 36 may further create, as the state data, spindle position data S8 indicating the position of the spindle of the machine tool 2 in addition to the tool data S1, the machining condition data S2, the workpiece data S3, the cutting fluid data S4, the machining process data S5, the cutting fluid discharge position data S6 and the cutting fluid discharge amount data S7. The spindle position data S8 can be defined as data indicating on which of the areas on the table of the machine tool 2 the spindle is present shown in FIG. 3 and so on. In the machining of the workpiece in the machine tool 2, a large amount of heat is generated in a contact position of a tool attached to the spindle and the workpiece. Therefore, by adding the spindle position data S8 to the data used in the learning, it is possible to learn information concerning a discharge amount of the cutting fluid to the position where the tool and the workpiece are in contact. Furthermore, by adding the spindle position data S8 to the data used in the learning, it is possible to utilize the data for estimation of the discharge amount of the cutting fluid to the position where the tool and the workpiece are in contact.

Figure 6:
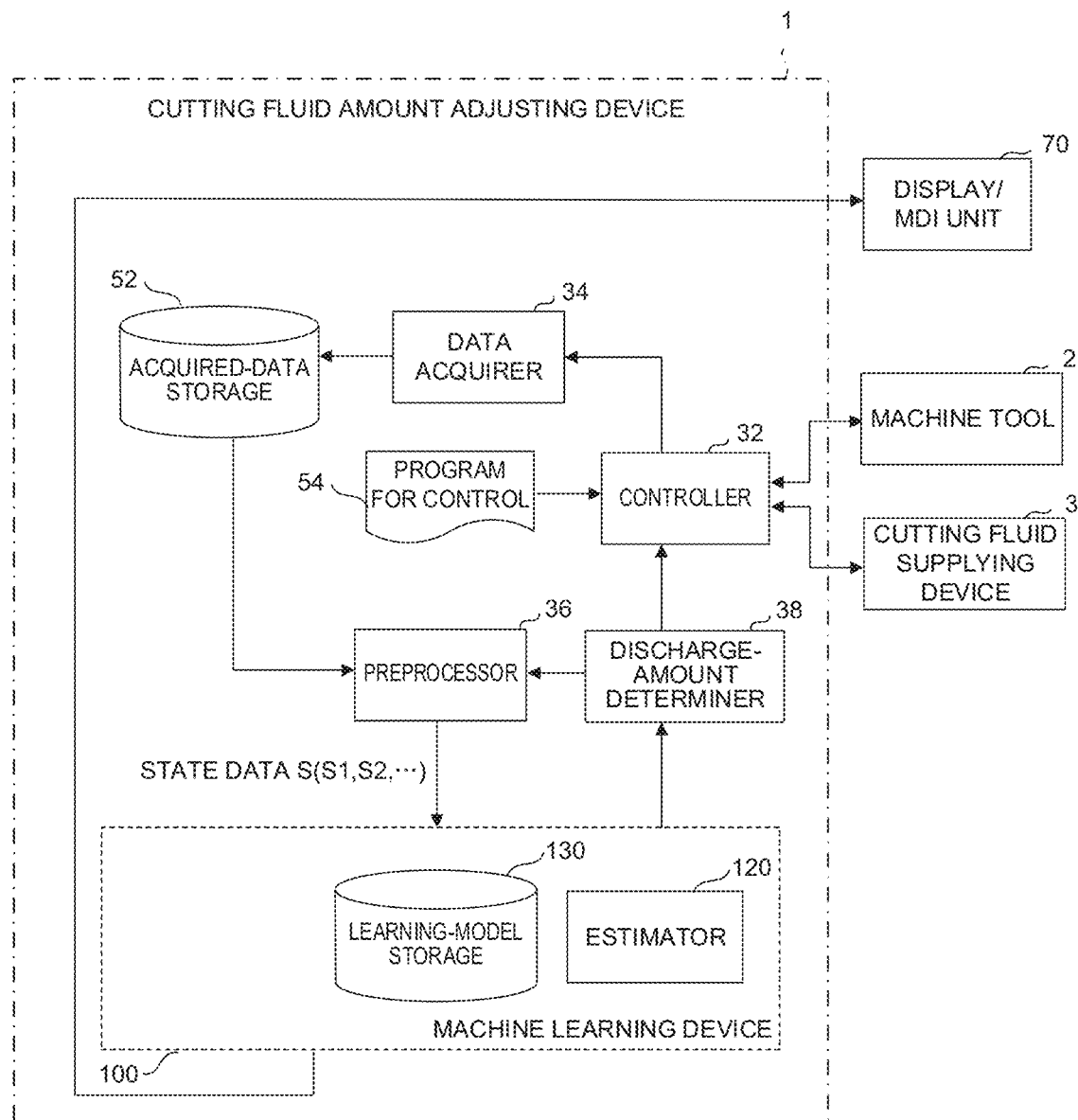
FIG. 6 is a schematic functional block diagram of a cutting fluid amount adjusting device according to a second embodiment of the present invention.

FIG. 6 is a schematic functional block diagram of the cutting fluid amount adjusting device 1 according to a second embodiment and the machine learning device 100 therein. The adjusting device 1 in this embodiment includes components required when the machine learning device 100 estimates evaluation of discharge amounts of cutting fluid discharged from the respective cutting fluid nozzles (an estimation mode). Functional blocks shown in FIG. 6 are actualized by the CPU 11 included in the adjusting device 1 and the processor 101 in the machine learning device 100 shown in FIG. 1 executing the respective system programs thereof and controlling the operations of the components of the adjusting device 1 and the machine learning device 100.

The cutting fluid amount adjusting device 1 according to this embodiment includes a discharge-amount determiner 38, in addition to the controller 32, the data acquirer 34 and the preprocessor 36. The machine learning device 100 included in the adjusting device 1 includes, in particular, the estimator 120. The acquired-data storage 52 for storing data acquired from the machine tool 2, the cutting fluid supplying device 3, and the like is provided on the nonvolatile memory 14 shown in FIG. 1. The learning-model storage 130 for storing a learning model constructed by machine learning by the learner 110 described in the first embodiment is provided on the nonvolatile memory 104 in the machine learning device 100 shown in FIG. 1.

The controller 32 and the data acquirer 34 in this embodiment have functions similar to those of the controller 32 and the data acquirer 34 in the first embodiment.

The preprocessor 36 in this embodiment converts, in a stage of estimation of evaluation of discharge amounts of the cutting fluid discharged from the respective cutting fluid nozzles performed using a learning model by the machine learning device 100, data acquired by the data acquirer 34 into a unified form treated in the machine learning device 100. A conversion form may be, for example, digitization or sampling. With such conversion, the preprocessor 36 in this embodiment creates the state data S of a predetermined form used in the estimation by the machine learning device 100.

In creating the state data S, the preprocessor 36 in this embodiment creates, about the cutting fluid nozzle commanded from the discharge-amount determiner 38, the cutting fluid discharge amount data S7 indicating a commanded discharge amount. For example, the preprocessor 36 creates the tool data S1, the machining condition data S2, the workpiece data S3, the cutting fluid data S4, the machining process data S5 and the cutting fluid discharge position data S6 based on the data acquired by the data acquirer 34. Furthermore, the preprocessor 36 creates, based on a command from the discharge-amount determiner 38, about the commanded cutting fluid nozzle, the cutting fluid discharge amount data S7 indicating the commanded discharge amount. In an initial period of the estimation, the preprocessor 36 may create, about the respective cutting fluid nozzles, the cutting fluid discharge amount data S7 indicating predetermined discharge amounts of the cutting fluid.

The estimator 120 executes a system program read out from the ROM 102 by the processor 101 included in the cutting fluid amount adjusting device 1 shown in FIG. 1. The estimator 120 is actualized by the processor 101 mainly performing the arithmetic processing using the RAM 103 and the nonvolatile memory 104. The estimator 120 estimates, based on the state data S created by the preprocessor 36, evaluation of the discharge amounts of the cutting fluid discharged from the respective cutting fluid nozzles performed using the learning model stored in the learning-model storage 130.

The estimator 120 in this embodiment inputs the state data S, which is supplied from the preprocessor 36, to the learning model generated (so to speak, parameters of which are determined) by the learner 110 to estimate and output evaluation of the discharge amounts of the cutting fluid discharged from the respective cutting fluid nozzles. The result of the estimation by the estimator 120 is output to the discharge-amount determiner 38.

The discharge-amount determiner 38 executes the system program read out from the ROM 12 by the CPU 11 included in the cutting fluid amount adjusting device 1 shown in FIG. 1. The discharge-amount determiner 38 is actualized by the CPU 11 mainly performing the arithmetic processing using the RAM 13 and the nonvolatile memory 14. The discharge-amount determiner 38 is regarded as functional means for determining, based on an estimation result of the evaluation of the discharge amounts of the cutting fluid discharged from the respective cutting fluid nozzles estimated by the estimator 120, amounts of the cutting fluid discharged from the respective cutting fluid nozzles.

The discharge-amount determiner 38 searches, with respect to the respective cutting fluid nozzles, the result of the estimation of the evaluation of the discharge amounts output from the estimator 120. When the result of the estimation indicates that "the discharge amounts are sufficient", the discharge-amount determiner 38 commands the preprocessor 36 to create the state data S in which the discharge amounts of the cutting fluid nozzles are reduced by one stage. On the contrary, when the result of the estimation indicates that "the discharge amounts are insufficient", the discharge-amount determiner 38 commands the preprocessor 36 to create the state data S in which the discharge amounts of the cutting fluid nozzles are increased by one stage. The discharge-amount determiner 38 repeats such processing to search for, about the respective cutting fluid nozzles, minimum discharge amounts of the cutting fluid with which the result of the estimation that "the discharge amounts are sufficient" is obtained. Moreover, the discharge-amount determiner 38 determines the discharge amounts of the cutting fluid obtained by the search as discharge amounts of the cutting fluid in the cutting fluid nozzles.

Figure 7:
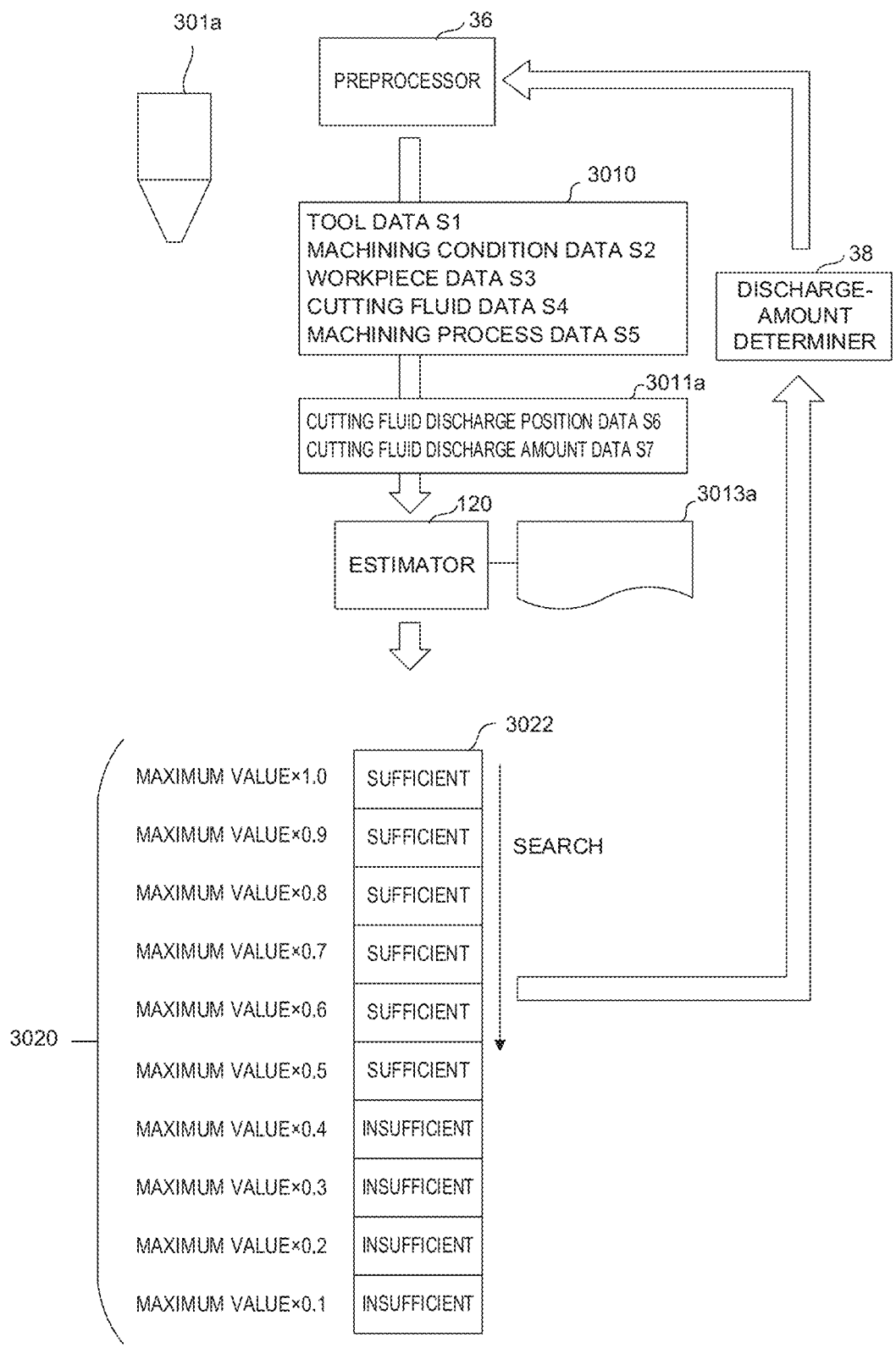
FIG. 7 is a diagram for illustrating an operation of a discharge-amount determiner.

A flow of the determination of a discharge amount of the cutting fluid in the cutting fluid nozzle by the discharge-amount determiner 38 will be described with reference to FIG. 7. In an embodiment shown in FIG. 7, it is assumed that a discharge amount 3020 of the cutting fluid of the cutting fluid nozzle can be adjusted in ten stages. In determining the discharge amount 3020 of the cutting fluid of the cutting fluid nozzle (in the case of FIG. 7, a discharge amount of the cutting fluid of the cutting fluid nozzle 301*a*), at first, the preprocessor 36 creates the state data S including the cutting fluid discharge amount data S7 indicating a predetermined discharge amount (for example, a maximum value×1.0).

The estimator 120 estimates evaluation of the discharge amount 3020 of the cutting fluid based on the state data S created by the preprocessor 36, that is, the data 3010 and 3011*a*. When the estimator 120 outputs an estimation result 302 indicating that "the discharge amount is sufficient", the discharge-amount determiner 38 commands the preprocessor 36 to create the state data S in which the discharge amount 3020 is reduced by one stage. The preprocessor 36 creates, based on the command from the discharge-amount determiner 38, the state data S in which the discharge amount 3020 is reduced by one stage. The discharge-amount determiner 38 then estimates the evaluation of the discharge amount 3020 by the estimator 120 based on the created state data S. When this is repeated and the evaluation or the estimation result 3022 from the estimator 120 changes from "the discharge amount is sufficient" to "the discharge amount is insufficient", the discharge-amount determiner 38 determines that the discharge amount 3020 of the cutting fluid in a stage of command to the preprocessor 36 immediately preceding that time is an appropriate discharge amount of the cutting fluid (the smallest discharge amount of the cutting fluid, evaluation of which is "the discharge amount is sufficient"). The discharge-amount determiner 38 determines the discharge amount as a discharge amount of the cutting fluid of the cutting fluid nozzle based on this determination. The discharge-amount determiner 38 executes such processing on all the cutting fluid nozzles.

The search for a discharge amount of the cutting fluid by the discharge-amount determiner 38 may be started from the maximum value of the discharge amount as described above. Alternatively, the discharge-amount determiner 38 may search the discharge amount of the cutting fluid from a minimum value of the discharge amount to larger values or from an intermediate value of the discharge amount to larger and smaller values. The minimum value of the discharge amount may be searched using a known algorithm such as binary search.

After determining the discharge amounts 3020 of the cutting fluid of all the cutting fluid nozzles, the discharge-amount determiner 38 commands the controller 32 to adjust the discharge amounts of the cutting fluid to the determined discharge amounts.

The cutting fluid amount adjusting device 1 according to this embodiment including the configuration described above can adjust amounts of the cutting fluid discharged from the respective cutting fluid nozzles to smaller amounts with which the workpiece or the like can be sufficiently cooled.

As an alternative embodiment of the cutting fluid amount adjusting device 1 according to this embodiment, the preprocessor 36 may further create, as state data, the spindle position data S8 indicating the position of the spindle of the machine tool 2, in addition to the tool data S1, the machining condition data S2, the workpiece data S3, the cutting fluid data S4, the machining process data S5, the cutting fluid discharge position data S6 and the cutting fluid discharge amount data S7. The spindle position data S8 can be defined as data indicating on which of the areas on the table of the machine tool 2 the spindle is present illustrated in, for example, FIG. 3. In the machining of the workpiece in the machine tool 2, a large amount of heat is generated in a contact position of a tool attached to the spindle and the workpiece. Therefore, in the estimation of discharge amounts of the cutting fluid, by using the spindle position data S8, it is possible to estimate a sufficient amount of the cutting fluid discharged to the position where the tool and the workpiece are in contact.

In the following representation, the cutting fluid amount adjusting device 1 according to a third embodiment of the present invention will be described. The adjusting device 1 according to this embodiment has functional blocks similar to those in the first embodiment shown in FIG. 2. The adjusting device 1 in this embodiment includes components required when the machine learning device 100 performs supervised learning (a learning mode).

The controller 32 and the data acquirer 34 in this embodiment have functions similar to those of the controller 32 and the data acquirer 34 in the first embodiment.

The preprocessor 36 in this embodiment creates the tool data S1, the machining condition data S2, the workpiece data S3, the cutting fluid data S4, the machining process data S5 and the cutting fluid discharge position data S6, as the state data S. The preprocessor 36 in this embodiment creates, as the label data L, in a state of machining in which the state data S described above is acquired, appropriate discharge amount data L2, which is data relating to appropriate discharge amounts of the cutting fluid discharged from the respective cutting fluid nozzles.

The appropriate discharge amount data L2 is defined as data that takes, about each of the cutting fluid nozzles, as a label value, an appropriate discharge amount of the cutting fluid with respect to present states of the machine tool 2 and the cutting fluid supplying device 3. For example, an experienced operator, who is observing a machining state of a workpiece by the machine tool 2, may create the appropriate discharge amount data L2 based on input operation performed using the display/MDI unit 70. For example, the operator may adjust an amount of the cutting fluid discharged from any one of the cutting fluid nozzles and, when the similar machining state continues for a predetermined time in that state, create the appropriate discharge amount data L2 on the basis of discharge amounts of the cutting fluid from the respective cutting fluid nozzles at that time.

The learner 110 in this embodiment performs machine learning using learning data created by the preprocessor 36. The learner 110 generates, with a known method of supervised learning, a learning model that has learned discharge amounts of the cutting fluid discharged from the cutting fluid nozzles with respect to a machining state by the machine tool 2 and a supply state of the cutting fluid by the cutting fluid supplying device 3. The learner 110 stores the generated learning model in the learning-model storage 130.

Examples of the method of supervised learning performed by the learner 110 include a multilayer perceptron method, a recurrent neural network method, a Long Short-Term Memory method, and a convolutional neural network method.

The learner 110 in this embodiment generates, about the respective cutting fluid nozzles, learning models that have associated the discharge amounts of the cutting fluid discharged from the cutting fluid nozzles with the machining state by the machine tool 2 and the state of the cutting fluid supplied from the cutting fluid supplying device 3 and learned the associated matter. For example, when there are five cutting fluid nozzles as shown in FIG. 4, the learner 110 generates five learning models that have learned discharge amounts of the respective cutting fluid nozzles.

Figure 8:
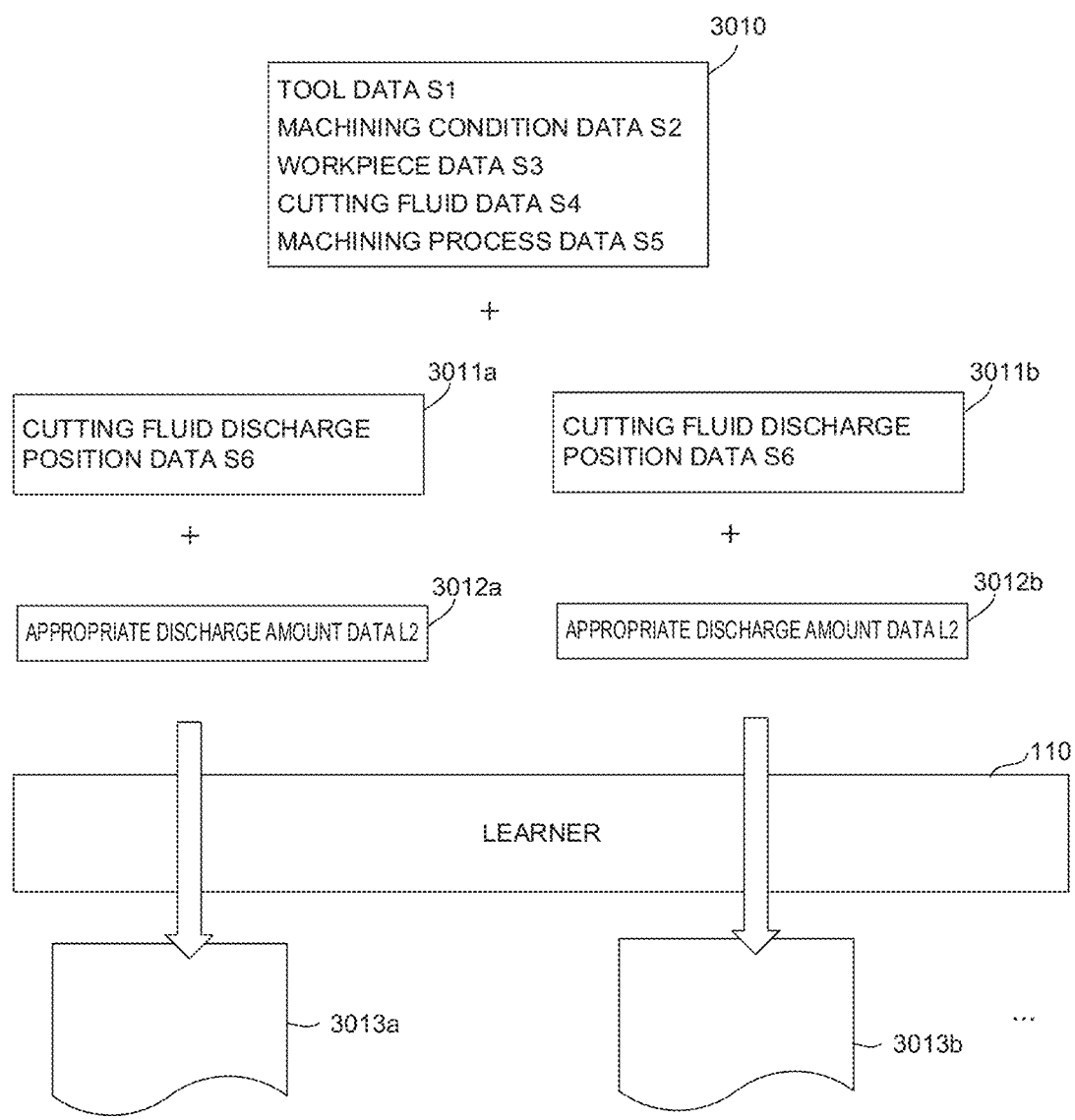
FIG. 8 is a diagram for illustrating an operation of a learner according to a third embodiment of the present invention.

FIG. 8 is a diagram showing an overview in which the learner 110 creates a learning model 3013 for each of the cutting fluid nozzles 301 using the state data S and the label data L. As shown in FIG. 8, in the state data S, the tool data S1, the machining condition data S2, the workpiece data S3, the cutting fluid data S4 and the machining process data S5 can be used in common among a plurality of cutting fluid nozzles. The learner 110 adds, to these common state data 3010, the cutting fluid discharge position data S6 (state data 3011 of the cutting fluid nozzles) and the appropriate discharge amount data L2 (label data 3012 of the cutting fluid nozzles) created for each of the cutting fluid nozzles 301 to generate a learning model 3013 for the respective cutting fluid nozzles that uses these data.

In this way, the learning model generated by the learner 110 in this embodiment estimates, about the respective cutting fluid nozzles, when the machining state by the machine tool 2 and the state of the cutting fluid supplied from the cutting fluid supplying device 3 are given, more appropriate discharge amounts of the cutting fluid discharged from the cutting fluid nozzles in such states.

The learner 110 is an essential component in a learning stage. However, the learner 110 is not always the essential component after the learning of the evaluation of the discharge amounts of the cutting fluid discharged from the cutting fluid nozzles by the learner 110 is completed. For example, when the machine learning device 100, for which the learning is completed, is shipped to a customer, the machine learning device 100 may be shipped after the learner 110 is removed.

The cutting fluid amount adjusting device 1 according to this embodiment including the configuration described above generates, about the respective cutting fluid nozzles, a learning model that has associated the discharge amounts of the cutting fluid discharged from the cutting fluid nozzles with the machining state by the machine tool 2 and the state of the cutting fluid supplied from the cutting fluid supplying device 3 and learned the associated matter.

The cutting fluid amount adjusting device 1 according to this embodiment needs to perform learning based on appropriate discharge amounts of the cutting fluid from the respective cutting fluid nozzles set by the operator. Therefore, it is difficult to collect learning data necessary for sufficient learning. However, once sufficient machine learning is completed, the estimator 120 explained below can directly estimate, using the learning model generated in this way, based on the state data S acquired from the machine tool 2 and the cutting fluid supplying device 3, more appropriate amounts of the cutting fluid discharged from the cutting fluid nozzles in the acquired state.

Figure 9:
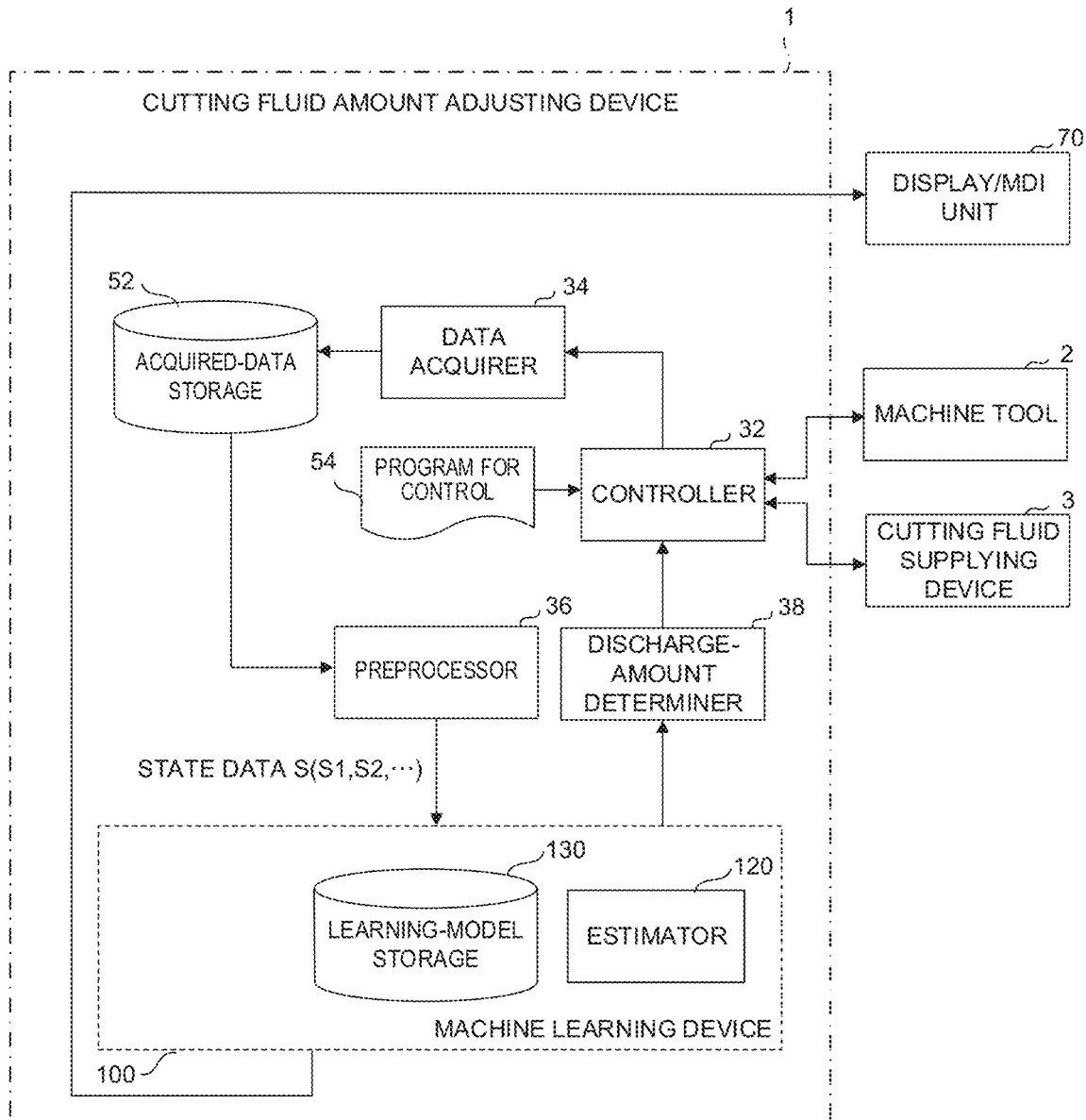
FIG. 9 is a schematic functional block diagram of a cutting fluid amount adjusting device according to a fourth embodiment of the present invention.

FIG. 9 is a schematic functional block diagram of the cutting fluid amount adjusting device 1 according to a fourth embodiment and the machine learning device 100 therein. The adjusting device 1 in this embodiment includes components required when the machine learning device 100 estimates evaluation of discharge amounts of cutting fluid discharged from the respective cutting fluid nozzles (an estimation mode). Functional blocks shown in FIG. 9 are actualized by the CPU 11 included in the cutting fluid amount adjusting device 1 and the processor 101 in the machine learning device 100 shown in FIG. 1 executing the respective system programs thereof and controlling the operations of the components of the adjusting device 1 and the machine learning device 100.

The cutting fluid amount adjusting device 1 in this embodiment includes the controller 32, the data acquirer 34, the preprocessor 36 and the discharge-amount determiner 38. The machine learning device 100 included in the adjusting device 1 includes the estimator 120. The acquired-data storage 52 for storing data acquired from the machine tool 2, the cutting fluid supplying device 3 and the like is provided on the nonvolatile memory 14 shown in FIG. 1. The learning-model storage 130 for storing a learning model constructed by the machine learning by the learner 110 described in the first embodiment is provided on the nonvolatile memory 104 in the machine learning device 100 shown in FIG. 1.

The controller 32 and the data acquirer 34 in this embodiment have functions similar to those in the second embodiment.

The preprocessor 36 in this embodiment converts, in a stage of estimation of evaluation of discharge amounts of the cutting fluid discharged from the respective cutting fluid nozzles performed using a learning model by the machine learning device 100, data acquired by the data acquirer 34 into a unified form treated in the machine learning device 100. The unified conversion form may be, for example, digitization or sampling. With such conversion, the preprocessor 36 according to this embodiment creates the state data S of a predetermined form used in the estimation by the machine learning device 100. The preprocessor 36 in this embodiment creates the tool data S1, the machining condition data S2, the workpiece data S3, the cutting fluid data S4, the machining process data S5, and the cutting fluid discharge position data S6 based on the data acquired by the data acquirer 34.

The estimator 120 in this embodiment estimates, based on the state data S created by the preprocessor 36, evaluation of discharge amounts of the cutting fluid discharged from the respective cutting fluid nozzles performed using the learning model stored in the learning-model storage 130. The estimator 120 in this embodiment inputs the state data S, which is input from the preprocessor 36, to the learning model generated (parameters of which are determined) by the learner 110. Further, the estimator 120 estimates more appropriate discharge amounts of the cutting fluid discharged from the respective cutting fluid nozzles based on the input state data S and outputs the more appropriate discharge amounts. The result of the estimation by the estimator 120 is output to the discharge-amount determiner 38.

The discharge-amount determiner 38 in this embodiment determines, as amounts of the cutting fluid discharged from the respective cutting fluid nozzles, an estimation result of the discharge amounts of the cutting fluid discharged from the respective cutting fluid nozzles estimated by the estimator 120. The discharge-amount determiner 38 further commands the controller 32 to adjust the discharge amounts of the cutting fluid to the determined discharge amounts.

The cutting fluid amount adjusting device 1 according to this embodiment including the configuration described above can adjust amounts of the cutting fluid discharged from the respective cutting fluid nozzles to smaller amounts with which the workpiece or the like can be sufficiently cooled.

Figure 10:
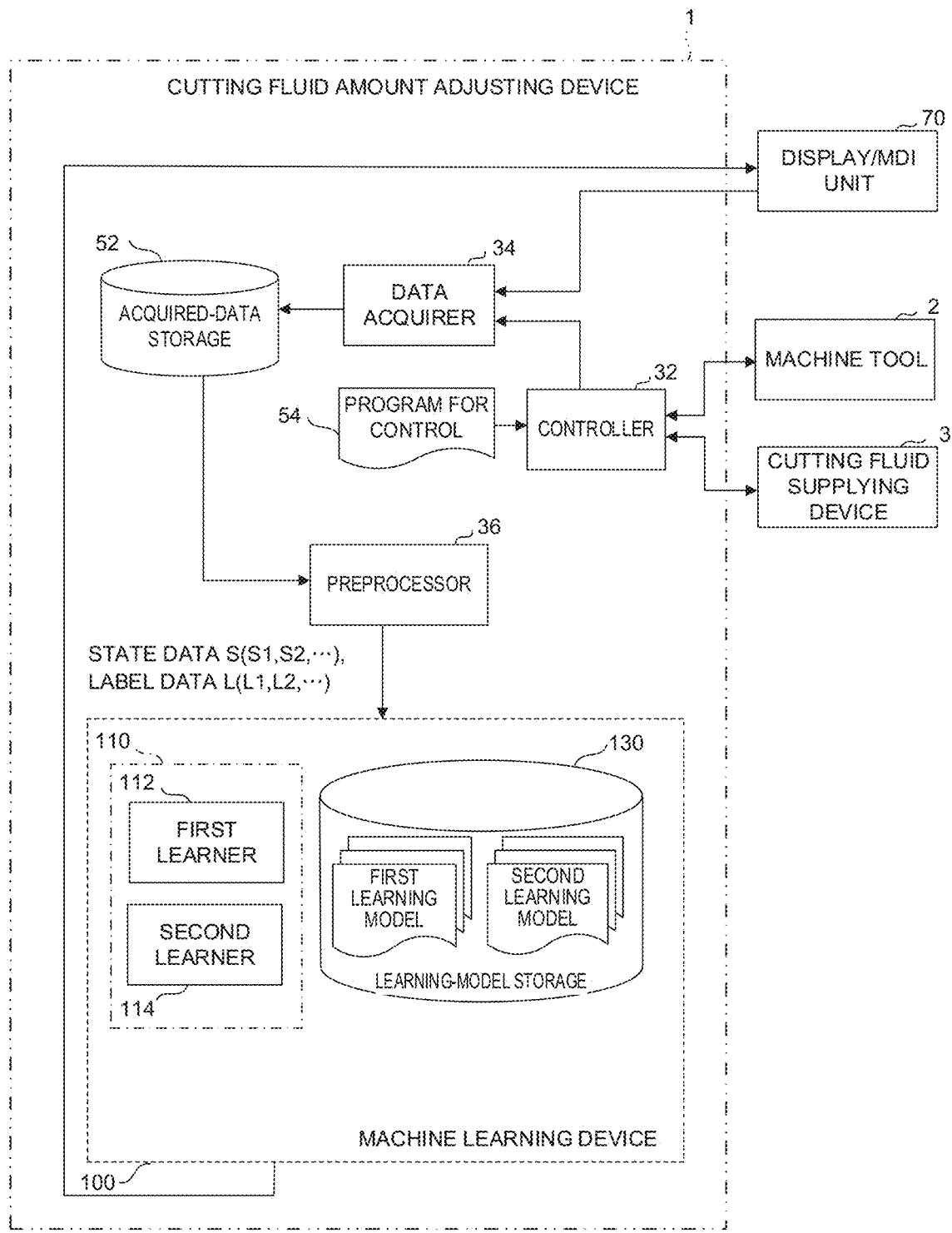
FIG. 10 is a schematic functional block diagram of a cutting fluid amount adjusting device according to a fifth embodiment of the present invention.

FIG. 10 is a schematic functional block diagram of the cutting fluid amount adjusting device 1 and the machine learning device 100 in a fifth embodiment. The cutting fluid amount adjusting device 1 in this embodiment includes components required when the machine learning device 100 performs supervised learning (a learning mode). Functional blocks shown in FIG. 10 are actualized by the CPU 11 included in the cutting fluid amount adjusting device 1 and the processor 101 in the machine learning device 100, which are shown in FIG. 1, executing the respective system programs thereof and controlling the operations of the components the adjusting device 1 and the machine learning device 100.

The cutting fluid amount adjusting device 1 in this embodiment includes the controller 32, the data acquirer 34 and the preprocessor 36. The machine learning device 100 in the adjusting device 1 includes the learner 110 with a first learner 112 and a second learner 114. The acquired-data storage 52 for storing data acquired from the machine tool 2, the cutting fluid supplying device 3 and the like is provided on the nonvolatile memory 14 shown in FIG. 1. The learning-model storage 130 for storing a learning model constructed by machine learning by the first learner 112 and the second learner 114 is provided on the nonvolatile memory 104 in the machine learning device 100 shown in FIG. 1.

The controller 32, the data acquirer 34 and the preprocessor 36 in this embodiment include functions similar to those in the first embodiment.

The learner 110 in this embodiment includes the first learner 112 and the second learner 114. As with the learner 110 described in the first embodiment, the first learner 112 performs machine learning using learning data created by the preprocessor 36 and generates, about the respective cutting fluid nozzles, a first learning model that has associated evaluation of discharge amounts of the cutting fluid discharged from the cutting fluid nozzles with a machining state by the machine tool 2 and a state of the cutting fluid supplied from the cutting fluid supplying device 3 and learned the associated matter. The first learning model generated by the first learner 112 estimates, about the respective cutting fluid nozzles, when the machining state by the machine tool 2 and the state of the cutting fluid supplied from the supplying device 3 are given to the first learning model, whether or not discharge amounts of the cutting fluid discharged from the cutting fluid nozzles in such states are sufficient.

As with the learner 110 described in the third embodiment, the second learner 114 performs machine learning using learning data and generates, about the respective cutting fluid nozzles, a second learning model that has associated discharge amounts of the cutting fluid discharged from the cutting fluid nozzles with a machining state by the machine tool 2 and a state of the cutting fluid supplied from the cutting fluid supplying device 3 and learned the associated matter. The second learner 114 analyzes a learning result of the first learning model generated by the first learner 112. The second learner 114 performs machine learning based on the analysis result to generate the second learning model. The second learner 114 executes, on the first learning model, for example, the processing similar to that executed by the discharge-amount determiner 38 described in the second embodiment and then searches for, about the respective cutting fluid nozzles, a minimum discharge amount of the cutting fluid with which an estimation result "the discharge amounts are sufficient" for the states of the machine tool 2 and the cutting fluid supplying device 3 is obtained. The second learner 114 performs the machine learning using the state of the machine tool 2 and the cutting fluid supplying device 3 and the discharge amount of the cutting fluid obtained by the search to generate, about the respective cutting fluid nozzles, the second learning model.

The cutting fluid amount adjusting device 1 according to this embodiment generates, using the first learning model generated by the machine learning method similar to that of the learner 110 in the adjusting device 1 described in the first embodiment, learning data used in the machine learning method similar to that of the learner 110 in the adjusting device 1 described in the third embodiment. Further, the adjusting device 1 generates the second learning model using the generated learning data. The adjusting device 1 described in the first embodiment can relatively easily create learning data and perform learning and, on the contrary, needs to perform search processing in order to determine discharge amounts of the cutting fluid of the cutting fluid nozzles using the created learning model. The adjusting device 1 described in the third embodiment can directly estimate more appropriate discharge amounts of the cutting fluid of the cutting fluid nozzles using the learning model and, on the contrary, it is difficult to collect learning data.

The cutting fluid amount adjusting device 1 according to this embodiment can generate, by combining these two learning methods, a learning model that can relatively easily collect learning data and can directly estimate more appropriate discharge amounts of the cutting fluid of the cutting fluid nozzles using the collected learning data. The learning model (the second learning model) generated in this way can be used in, for example, estimation of discharge amounts of the cutting fluid of the cutting fluid nozzles in the adjusting device 1 according to the fourth embodiment.

Figure 11:
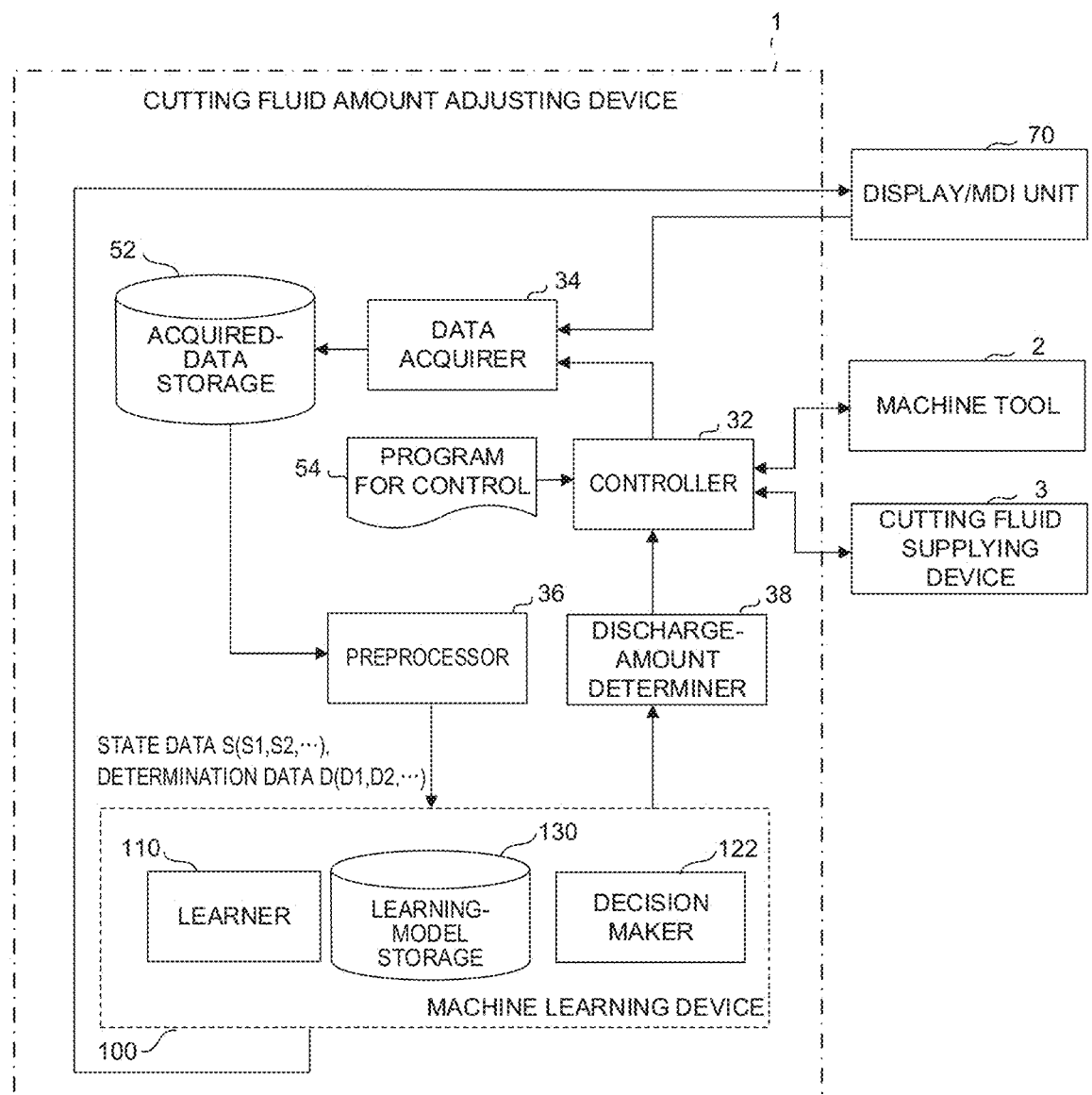
FIG. 11 is a schematic functional block diagram of a cutting fluid amount adjusting device according to a sixth embodiment of the present invention.

FIG. 11 is a schematic functional block diagram of the cutting fluid amount adjusting device 1 according to a sixth embodiment and the machine learning device 100 therein. Functional blocks shown in FIG. 11 are actualized by the CPU 11 in the adjusting device 1 and the processor 101 in the machine learning device 100 shown in FIG. 1 executing the respective system programs thereof and controlling the operations of the components of the adjusting device 1 and the machine learning device 100.

The cutting fluid amount adjusting device 1 in this embodiment includes the controller 32, the data acquirer 34 and the preprocessor 36. The machine learning device 100 in the adjusting device 1 includes a decision maker 122 in addition to the learner 110. The acquired-data storage 52 for storing data acquired from the machine tool 2, the cutting fluid supplying device 3 and the like is provided on the nonvolatile memory 14 shown in FIG. 1. The learning-model storage 130 for storing a learning model constructed on the basis of machine learning by the learner 110 is provided on the nonvolatile memory 104 in the machine learning device 100 shown in FIG. 1.

The controller 32 and the data acquirer 34 in this embodiment include functions similar to those in the first embodiment.

When the machine learning device 100 preforms reinforcement learning, the preprocessor 36 in this embodiment creates, as learning data, a set of the state data S and determination data D of a predetermined form in the learning. The preprocessor 36 creates the tool data S1, the machining condition data S2, the workpiece data S3, the cutting fluid data S4, the machining process data S5, the cutting fluid discharge position data S6 and the cutting fluid discharge amount data S7 as the state data S. The preprocessor 36 creates, as the determination data D, in a state of machining in which the above-mentioned state data S is acquired, discharge amount determination data D1, which is data for determining discharge amounts of the cutting fluid discharged from the respective cutting fluid nozzles, and workpiece state determination data D2, which is data for determining a cooling state of a workpiece and a cleaning state of chips.

The discharge amount determination data D1 is defined as, about each of the cutting fluid nozzles, data serving as a reference for determining whether or not a discharge amount of the cutting fluid is sufficiently small. The discharge amount determination data D1 may be data indicating whether or not an amount of the cutting fluid discharged from the cutting fluid nozzle has increased or decreased, for example, as a result of adjusting the amount of the cutting fluid discharged from the cutting fluid nozzle. The discharge amount determination data D1 may be data including a degree of the increase or decrease of the amount of the cutting fluid discharged from the cutting fluid nozzle.

The workpiece state determination data D2 is defined as data serving as a reference for determining, for instance, whether or not a workpiece is sufficiently cooled, whether or not chips adhere to the surface of the workpiece. An operator, who is observing a machining state of the workpiece by the machine tool 2 or a similar state, may create the workpiece state determination data D2 based on input operation performed using the display/MDI unit 70. Alternatively, when chips adhere to the surface of the workpiece, the operator may operate the display/MDI unit 70 and then input presence of a problem in the chip adhering position of the workpiece. Thereby, the preprocessor 36 can determine that an amount of the cutting fluid discharged from the cutting fluid nozzle in a position corresponding to the chip adhering position is small and then create the workpiece state determination data D2 indicating to that effect.

Temperature of portions of the workpiece may be measured using a temperature sensor such as a thermography attached to the machine tool 2. The workpiece state determination data D2 may be created based on the result of the measurement. In the example shown in FIG. 4, the temperature of the workpiece in the areas a-e may be measured to create the workpiece state determination data D2 indicating that, when the temperature does not sufficiently drop in the position of the area c, discharge amounts are small concerning the cutting fluid nozzles 301b, 301c and 301d (all of which are the cutting fluid nozzles spraying the cutting fluid on the area c) and, otherwise, the discharge amounts are proper.

Furthermore, the workpiece state determination data D2 may be created using a visual sensor, a distance sensor or the like attached to the machine tool 2 based on whether or not the chips are sufficiently removed from the portions of the workpiece. The workpiece state determination data D2 may include a degree of the cooling and a degree corresponding to a remaining state of the chips.

The learner 110 in this embodiment performs machine learning using learning data created by the preprocessor 36. The learner 110 generates, with a publicly-known method of reinforcement learning, about the respective cutting fluid nozzles, a learning model having learned an adjusting behavior for discharge amounts of the cutting fluid discharged from the cutting fluid nozzles with respect to a machining state by the machine tool 2 and a supply state of the cutting fluid by the cutting fluid supplying device 3. Further, the learner 110 stores the generated learning model in the learning-model storage 130. The reinforcement learning is a method of repeating, in a trial-and-error manner, a cycle of observing a present state (that is, an input) of an environment where a learning target is present, executing a predetermined behavior (that is, an output) in the present state, and giving some reward to the behavior and learning, as an optimum solution, a measure for maximizing a total of rewards. The measure for maximizing the total of rewards means, in the machine learning device 100 in the present invention, a behavior of adjusting discharge amounts of the cutting fluid from the cutting fluid nozzles. Examples of the method of the reinforcement learning performed by the learner 110 include Q learning.

In the Q learning by the learner 110, for example, a reward R can be set to a plus reward R when the discharge amount determination data D1 indicates that "the cutting fluid amount has decreased" and set to a minus reward R when the discharge amount determination data D1 indicates that "the cutting fluid amount has increased". The reward R can be set to the plus reward R when the workpiece state determination data D2 indicates that "the cutting fluid amount is appropriate" and set to the minus reward R when the workpiece state determination data D2 indicates that the "the cutting fluid amount is small". Further, the reward R may be a larger plus or minus reward R according to the magnitude of the degree indicated by the operation determination data D1 or the workpiece state determination data D2.

The learner 110 may be configured to use a neural network as a value function Q (a learning model), receive the state data S and a behavior a as inputs to the neural network, and output a value (a result y) of the behavior a in the state. When the learner 110 is configured in this way, a neural network including three layers of an input layer, an intermediate layer, and an output layer may be used as the learning model. However, it is also possible to configure the learner 110 to perform more effective learning and inference by using a method of so-called deep learning in which a neural network forming three or more layers is used. The learning model generated by the learner 110 is stored in the learning-model storage 130 provided on the nonvolatile memory 104. The learning model stored in the learning-model storage 130 is used in determination of an adjusting behavior for discharge amounts of the cutting fluid discharged from the cutting fluid nozzles by the decision maker 122.

The learner 110 is an essential component in a learning stage. However, the learner 110 is not always the essential component after the learning of the adjusting behavior for discharge amounts of the cutting fluid discharged from the cutting fluid nozzles by the learner 110 is completed. For example, when the machine learning device 100, for which the learning is completed, is shipped to a customer, the machine learning device 100 may be shipped after the learner 110 is removed.

The decision maker 122 executes the system program read out from the ROM 102 by the processor 101 in the cutting fluid amount adjusting device 1 shown in FIG. 1. The decision maker 122 is actualized by the processor 101 mainly performing the arithmetic processing using the RAM 103 and the nonvolatile memory 104. The decision maker 122 calculates, based on the state data S input from the preprocessor 36, an optimum solution of the adjusting behavior for discharge amounts of the cutting fluid discharged from the cutting fluid nozzles performed using the learning model stored in the learning-model storage 130. The decision maker 122 further outputs the adjusting behavior for discharge amounts of the cutting fluid discharged from the cutting fluid nozzles calculated as the optimum solution.

The decision maker 122 in this embodiment can calculate, by inputting, as input data, the state data S (the tool data S1, the machining condition data S2, the workpiece data S3, the cutting fluid data S4, the machining process data S5, the cutting fluid discharge position data S6 and the cutting fluid discharge amount data S7) input from the preprocessor 36 and the adjusting behavior for discharge amounts of the cutting fluid discharged from the cutting fluid nozzles (determination of a discharge amount of the cutting fluid for each of the cutting fluid nozzles) into the learning model generated (parameters of which are determined) by the reinforcement learning by the learner 110, a reward given when the behavior is taken in a present state. Therefore, the decision maker 122 performs such calculation of the reward about the adjusting behavior for discharge amounts of the cutting fluid that can be taken at present, compares the calculated plurality of rewards, and determines, as an optimum solution, the adjusting behavior for a discharge amount of the cutting fluid discharged from the cutting fluid nozzle for which the largest reward is calculated. The optimum solution of the adjusting behavior for the discharge amount of the cutting fluid discharged from the cutting fluid nozzle determined by the decision maker 122 may be input to the discharge-amount determiner 38 and used in determination of a discharge amount of the cutting fluid discharged from the cutting fluid nozzle. Besides, the optimum solution of the adjusting behavior may be used by, for example, being output to and displayed on the display/MDI unit 70 or transmitted and output via a not-shown wired/wireless network to a fog or a cloud computer and so on.

In the cutting fluid amount adjusting device 1 including the configuration described above, it is possible to appropriately adjust the discharge amounts of the cutting fluid discharged from the cutting fluid nozzles under an environment in which the machine tool 2 and the cutting fluid supplying device 3 are operating.

In seventh to ninth embodiments below, explanation will be made to embodiments mounted as a part of a system in which the cutting fluid amount adjusting device 1 according to the first to sixth embodiments is connected to, via a wired or wireless network, a plurality of devices including a cloud server, a host computer, a fog computer and an edge computer (such as a robot controller and a control device).

Figure 12:
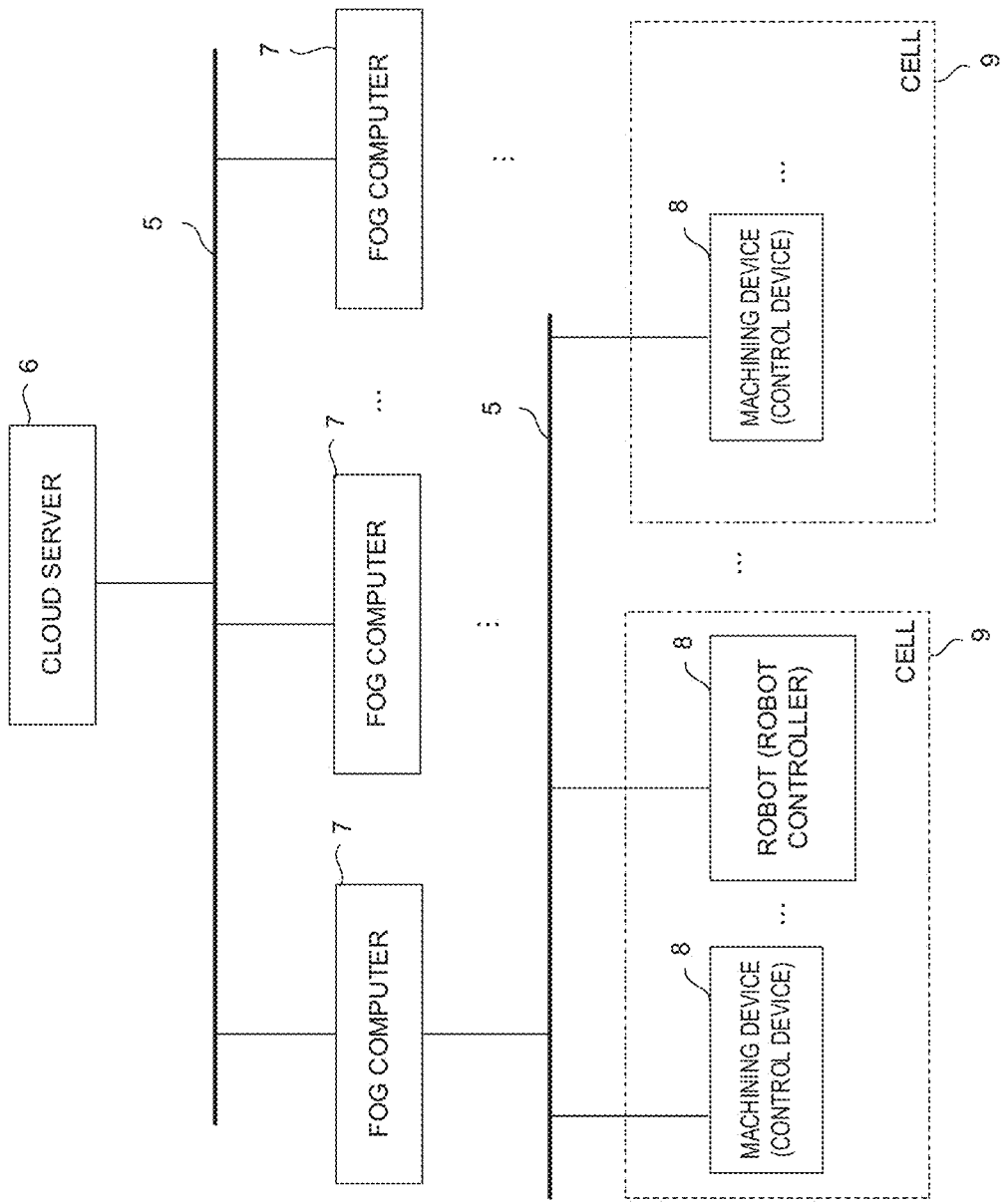
FIG. 12 is a diagram showing an example of a system of a three-layer structure including a cloud server, a fog computer and an edge computer.

As shown in FIG. 12, in the seventh to ninth embodiments described below, a system is assumed, the system being configured to be logically divided into three layers having a layer including a cloud server 6 and the like, a layer including fog computers 7 and the like, and a layer including edge computers 8 (such as a robot controller and a control device, included in cells 9) and the like in a state in which each of a plurality of devices is connected to a network. In such system, the cutting fluid amount adjusting device 1 according to an aspect of the present invention can also be mounted on any one of the cloud server 6, the fog computers 7 and the edge computers 8. With such configuration, the adjusting device 1 can share data used in processing relating to machine learning one another and perform distributed learning among the respective plurality of devices via a network, collect generated learning models in the fog computers 7 and the cloud server 6 to perform a large-scale analysis. The adjusting device 1 can further, for instance, mutually reuse the generated learning models.

In the system shown in FIG. 12, a plurality of cells 9 are respectively provided in factories in various places. The fog computers 7 in a higher layer manage the respective cells 9 in predetermined unit (such as factory unit or unit of a plurality of factories of the same manufacturer). The cloud server 6 in a further higher layer collects data collected and analyzed by the fog computers 7 and performs analysis and/or other processing of the data. Information obtained as the result of the analysis and/or the data procession can be utilized in control and the like in the respective edge computers 8.

Figure 13:
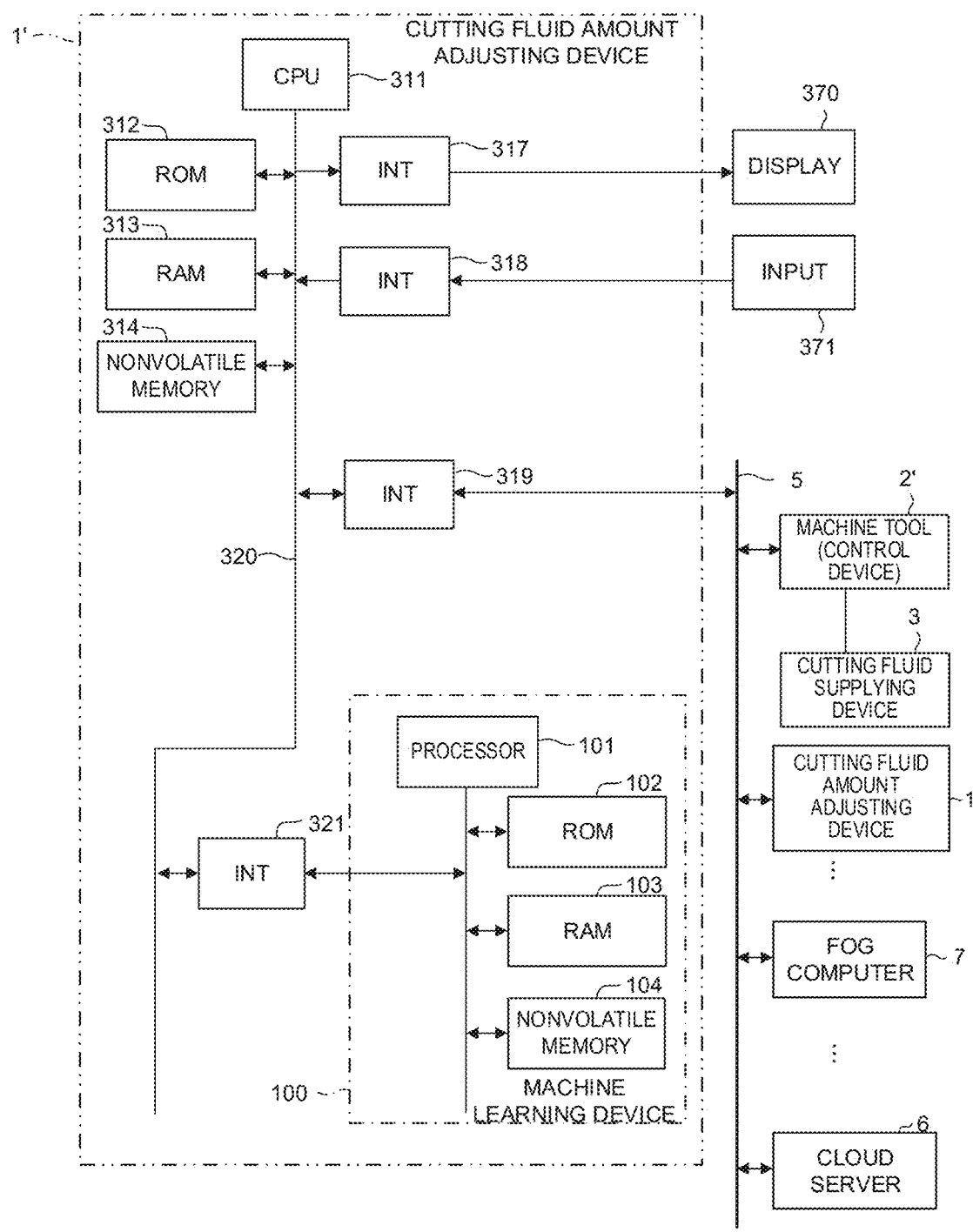
FIG. 13 is a schematic hardware configuration diagram of a form of a cutting fluid amount adjusting device mounted on a computer.

FIG. 13 is a schematic hardware configuration diagram in which a cutting fluid amount adjusting device is mounted on a computer such as a cloud server or a fog computer.

In this embodiment, a cutting fluid amount adjusting device 1' implemented on a computer includes a CPU 311, a ROM 312, a RAM 313 and a nonvolatile memory 314. The cutting fluid amount adjusting device 1' further includes interfaces 317, 318, 319 and 321. The above-mentioned components in the adjusting device 1' are connected via a bus 320 to one another.

The CPU 311 is a processor capable of wholly controlling the cutting fluid amount adjusting device 1'. The CPU 311 reads out a system program stored in the ROM 312 via the bus 320 to control the entire adjusting device 1' according to the system program. The RAM 313 temporarily stores various data and the like. The various data temporarily stored in the RAM 313 are, for example, temporary calculation and display data and further various kind of data input by an operator via a not-shown input section.

The nonvolatile memory 314 is, for example, backed up by a not-shown battery to be configured as a memory in which a stored state is retained even if the cutting fluid amount adjusting device 1' is turned off. The nonvolatile memory 314 stores a program which is input via an input device 371 and various data acquired from a robot via the components of the adjusting device 1' and a network 5. The program and the various data stored in the nonvolatile memory 314 may be evolved on the RAM 313 during execution or use. Various system programs such as a known analysis program are written in advance in the ROM 312. The system programs written in the ROM 312 in advance include a system program for controlling exchange with the machine learning device 100 described below.

The cutting fluid amount adjusting device 1' is connected via the interface 319 to the wired or wireless network 5. At least one machine tool 2' (a machine tool including a control device), other cutting fluid amount adjusting devices 1, the edge computers 8, the fog computers 7, the cloud server 6 and the like are connected to the network 5. Exchange of data is mutually performed via the network 5 between the adjusting device 1' and the elements connected to the network 5.

The cutting fluid amount adjusting device 1' according to this embodiment is further connected via the interface 317 to a display device 370 and further via the interface 318 to an input device 371.

The display device 370 outputs and displays data read on the memory, data obtained as a result of executing a program or the like via the interface 317 and other data. The input device 371 configured from a keyboard, a pointing device and the like passes a command based on operation by the operator, data and the like via the interface 318 to the CPU 311.

The interface 321 is intended to connect the cutting fluid amount adjusting device 1' with the machine learning device 100. The machine learning device 100 includes components similar to those described with reference to FIG. 1.

When the cutting fluid amount adjusting device 1' is mounted on the computer such as the cloud server or the fog computer in this way, the functions of the adjusting device 1' are similar to those described in the first to sixth embodiments except that the acquisition of information from the machine tool 2' and the cutting fluid supplying device 3 and the command for the adjustment of discharge amounts of the cutting fluid, which is discharged from the cutting fluid nozzles, to the supplying device 3 are exchanged via the network 5.

At this time, because the machine tool 2' includes the control device, the controller 32 in the cutting fluid amount adjusting device 1' does not perform control of the machine tool 2' but performs acquisition of information concerning a machining state by the machine tool 2' from the control device included in the tool 2'. The controller 32 in the adjusting device 1' performs indirect control of the cutting fluid supplying device 3 via the control device in the machine tool 2' and further performs acquisition of a supply state of the cutting fluid via the control device included in the tool 2'.

Figure 14:
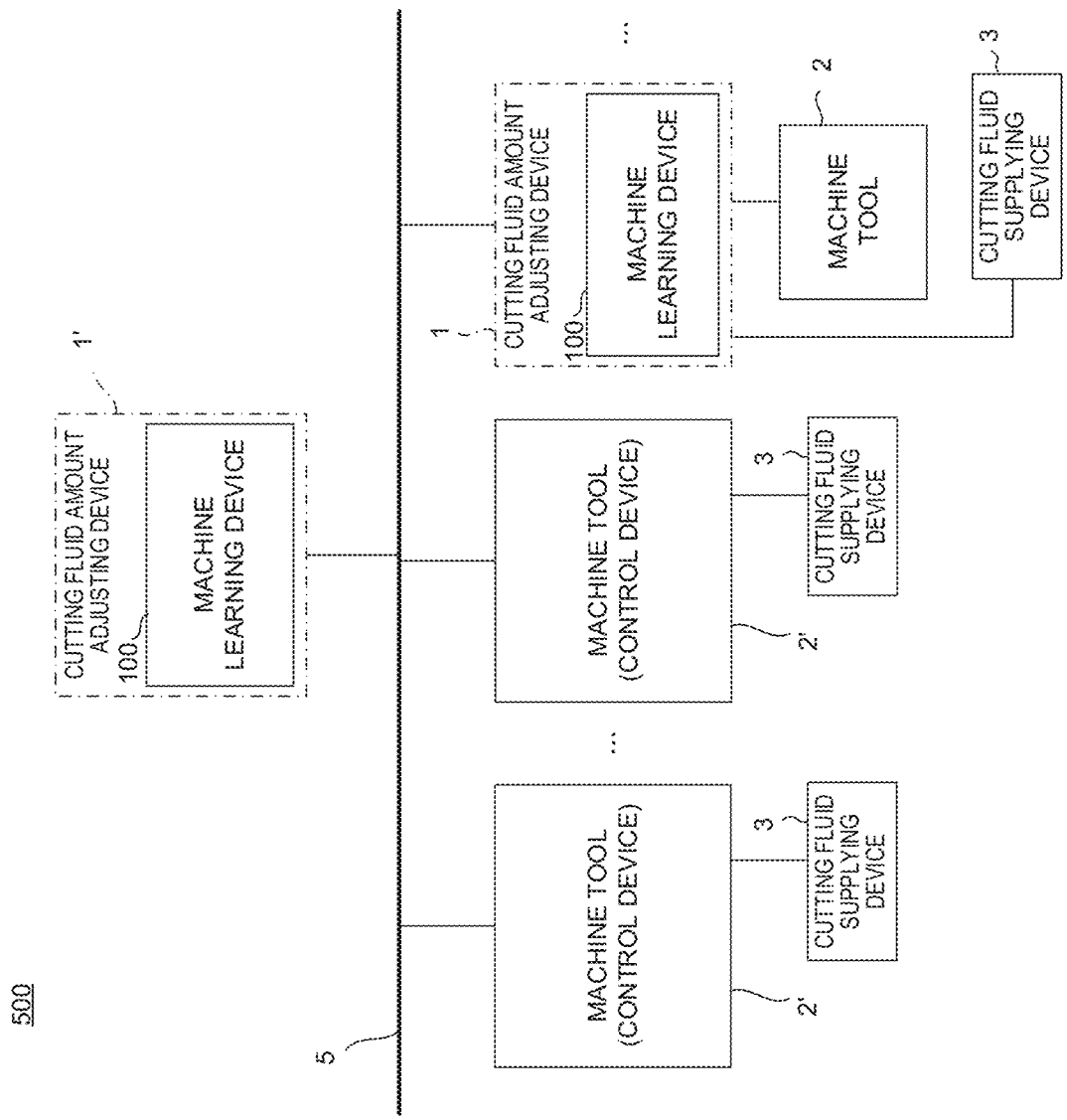
FIG. 14 is a schematic configuration diagram of a cutting fluid amount adjusting system according to a seventh embodiment of the present invention.

FIG. 14 is a schematic configuration diagram of a cutting fluid amount adjusting system according to a seventh embodiment including the cutting fluid amount adjusting device 1'. In this system, a cutting fluid amount adjusting system 500 includes a plurality of cutting fluid amount adjusting devices 1 and 1', a plurality of machine tools 2' and the network 5 for connecting the adjusting devices 1 and 1' with the machine tools 2' to one another.

In the cutting fluid amount adjusting system 500, the cutting fluid amount adjusting device 1' including the machine learning device 100 adjusts, using a learning result of the learner 110, based on a machining state by the machine tool 2' and a supply state of cutting fluid by the cutting fluid supplying device 3, amounts of the cutting fluid discharged from the respective cutting fluid nozzles in the supplying device 3 set as an adjustment target. At least one adjusting device 1' learns, based on the state variable S and the label data L or the determination data D obtained by each of the other plurality of adjusting devices 1 and 1', adjustment of amounts of the cutting fluid discharged from the respective cutting fluid nozzles with respect to machining states by the machine tools 2 and 2' and a supply state of the cutting fluid by the supplying device 3 common to all the adjusting devices 1 and 1'. The system 500 can be configured such that all the adjusting devices 1 and 1' share the result of the learning. Therefore, the system 500 can receive an input of a more variety of data set (including a state variable S and the label data L or the determination data D) to improve speed and reliability of learning.

Figure 15:
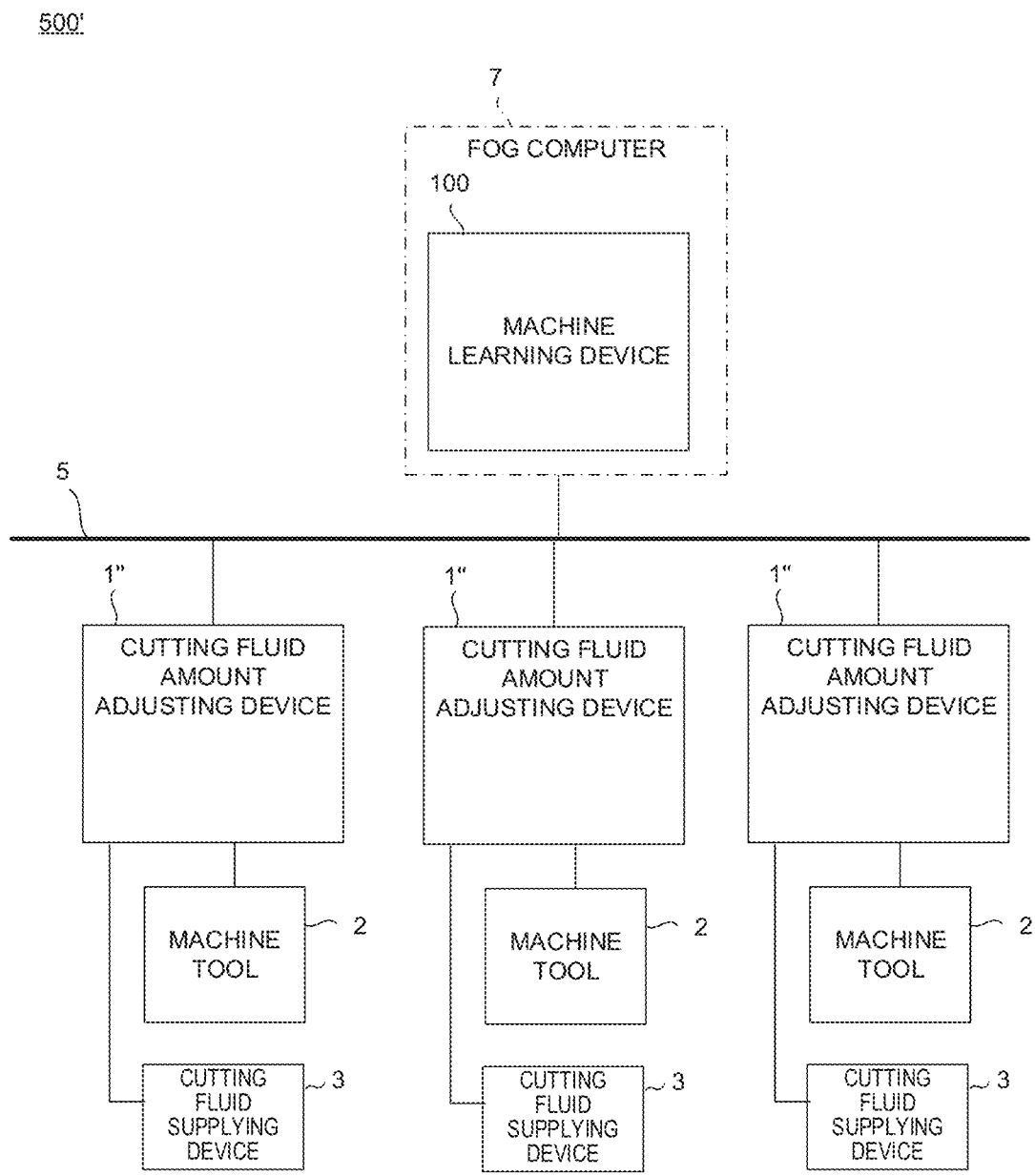
FIG. 15 is a schematic configuration diagram of a cutting fluid amount adjusting system according to an eighth embodiment of the present invention.

FIG. 15 is a schematic configuration diagram of a system according to an eighth embodiment in which a machine learning device and a cutting fluid amount adjusting device are mounted on different devices. According to the eighth embodiment, a cutting fluid amount adjusting system 500' includes at least one machine learning device 100 mounted as a part of a computer such as a cloud server, a host or a fog computer, a plurality of cutting fluid amount adjusting devices 1" and the network 5 for mutually connecting the cutting fluid amount adjusting devices 1" with the computer. FIG. 15 shows an embodiment in which the machine learning device 100 is mounted as a part of the fog computer 7. As with the schematic hardware configuration of the cutting fluid amount adjusting device 1' shown in FIG. 13, a hardware configuration of the computer is configured by connecting, via the bus 320, hardware such as the CPU 311, the RAM 313 and the nonvolatile memory 314, the hardware being included in a general computer.

In the cutting fluid amount adjusting system 500' having the configuration described above, the machine learning device 100 learns, based on the state variable S and the label data L or the determination data D obtained about each of the plurality of cutting fluid amount adjusting devices 1", adjustment of amounts of the cutting fluid discharged from the respective cutting fluid nozzles included in the cutting fluid supplying device 3, with respect to a machining state by the machine tool 2 and a supply state of the cutting fluid by the supplying device 3 common to all the adjusting devices 1". Furthermore, the machine learning device 100 can perform, using the result of the learning, adjustment of amounts of the cutting fluid discharged from the respective cutting fluid nozzles in the supplying device 3. With the configuration of the system 500', a necessary number of the adjusting devices 1" can be connected to the machine learning device 100 when necessary irrespective of a period and a place where each of the plurality of adjusting devices 1" is present.

Figure 16:
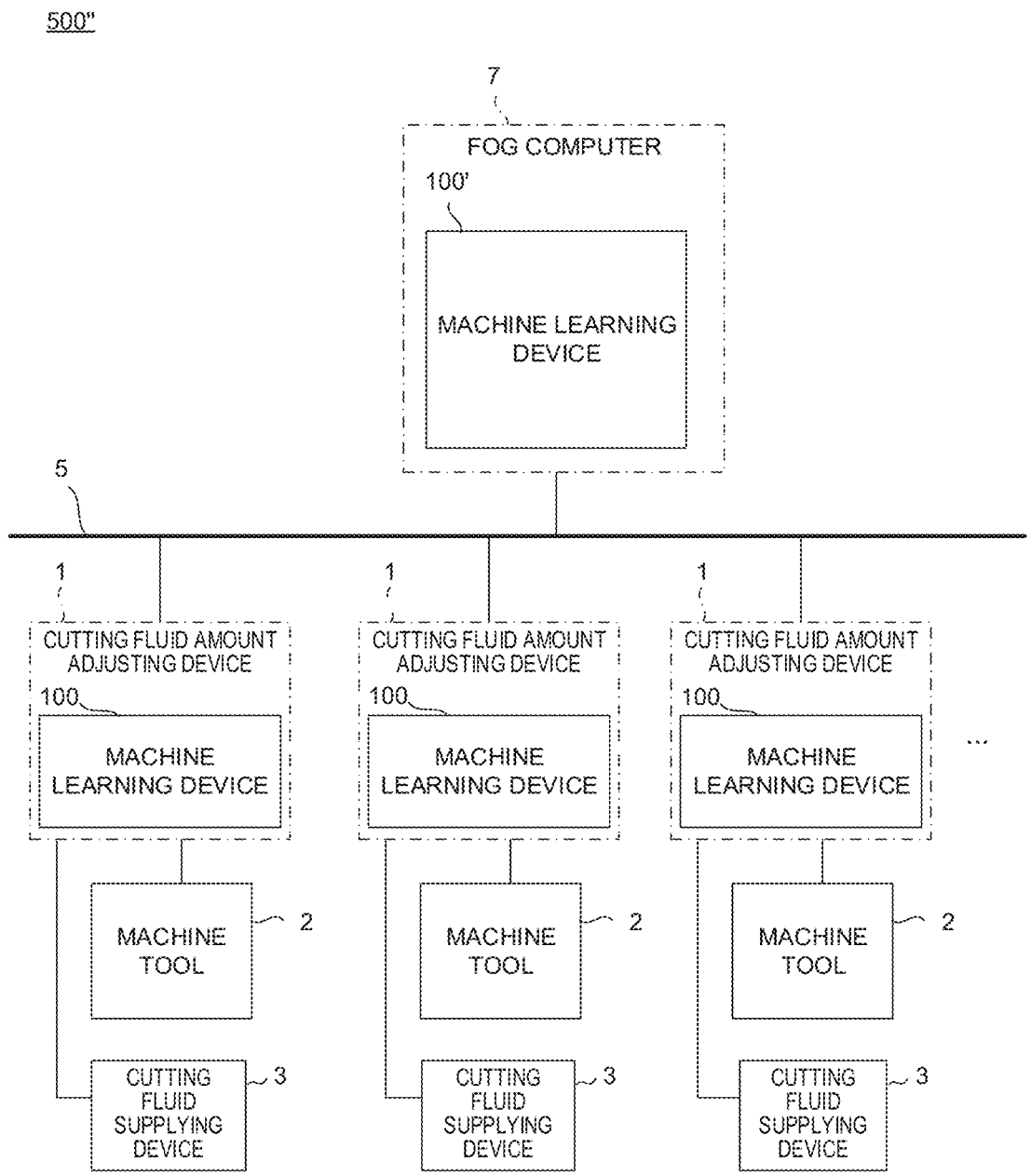
FIG. 16 is a schematic configuration diagram of a cutting fluid amount adjusting system according to a ninth embodiment of the present invention.

FIG. 16 is a schematic configuration diagram of a cutting fluid amount adjusting system 500" according to a ninth embodiment, the system 500" including a machine learning device 100' and the cutting fluid amount adjusting device 1. The system 500" includes at least one machine learning device 100' mounted on a computer such as an edge computer, a fog computer, a host computer or a cloud server, a plurality of adjusting devices 1 and the wired or wireless network 5 for connecting the cutting fluid amount adjusting devices 1 with the computer to each other. FIG. 16 shows an embodiment in which the machine learning device 100' is mounted as a part of the fog computer 7.

In the cutting fluid amount adjusting system 500" having the configuration described above, the fog computer 7 including the machine learning device 100' acquires, from the respective cutting fluid amount adjusting devices 1, learning models obtained as results of machine learning by the machine learning devices 100 in the adjusting devices 1. The machine learning device 100' in the fog computer 7 performs processing of optimization and streamlining of knowledge based on these plurality of learning models to generate a learning model optimized and streamlined anew. Furthermore, the machine learning device 100' distributes the generated learning model to the respective adjusting devices 1.

The optimization and the streamlining of the learning model performed by the machine learning device 100' includes generation of a distillation model based on the plurality of learning models acquired from the cutting fluid amount adjusting devices 1. In this case, the machine learning device 100' in this embodiment creates input data supplied to the learning model. Subsequently, the machine learning device 100' generates a learning model (a distillation model) anew by performing learning from the beginning using outputs obtained as the result of inputting the input data to the respective learning models. As described above, the distillation model generated in this way is distributed to the adjusting devices 1 and other computers via an external storage medium or the network 5 and then utilized.

As another example of the optimization and the streamlining of the learning model performed by the machine learning device 100', it is also conceivable to undergo the following process. That is, in a process for performing distillation on the plurality of learning models acquired from the cutting fluid amount adjusting devices 1, the machine learning device 100' analyzes, with a general statistical method, a distribution of output data of the learning models with respect to the input data, extracts an outlier of a set of the input data and the output data and then performs distillation using the set of the input data and the output data from which the outlier is excluded. By undergoing such a process, it is possible to exclude an exceptional estimation result from the set of the input data and the output data obtained from the respective learning models and generate a distillation model using the set of the input data and the output data from which the exceptional estimation result is excluded. The distillation model generated in this way can be utilized as a more generic learning model compared with the learning model generated by the plurality of cutting fluid amount adjusting devices 1.

It is also possible to introduce a method of optimization and streamlining of other general learning models as appropriate. For example, the method is to analyze the learning models and then optimize hyper parameters of the learning models based on the result of the analysis.

In the cutting fluid amount adjusting system 500" according to this embodiment, for example, the machine learning device 100' may be disposed on the fog computer 7 set with respect to the plurality of cutting fluid amount adjusting devices 1 functioning as edge computers. Learning models generated by the respective adjusting devices 1 may be aggregated and stored on the fog computer 7. The machine learning device 100' in the fog computer 7 can perform operation for performing optimization and streamlining based on the stored plurality of learning models and then redistributing the optimized and streamlined learning models to the adjusting devices 1 according to necessity.

The cutting fluid amount adjusting system 500" according to this embodiment can collect, on a higher-order host computer or cloud server, for example, the learning models aggregated and stored on the fog computer 7 and the learning models optimized and streamlined on the fog computer 7 to perform application to intellectual work in a factory or a manufacturer of the cutting fluid amount adjusting devices 1 using these learning models. Such application to the intellectual work includes, for example, construction and redistribution of a more generic learning model in a higher-order server, support of maintenance work based on an analysis result of the learning models, an analysis of performance and the like of the respective adjusting devices 1, and application to development of a new machine.

The embodiments of the present invention are described above. However, the present invention is not limited to only the embodiments described above and can be carried out in various forms by adding appropriate modifications.

For example, in the above-mentioned embodiments, the cutting fluid amount adjusting device 1 and the machine learning device 100 are described as the devices including the different CPUs (processors). However, the machine learning device 100 may be actualized by the CPU 11 in the cutting fluid amount adjusting device 1 and the system program stored in the ROM 12.

The invention claimed is:

1. A cutting fluid amount adjusting device for adjusting a discharge amount of cutting fluid from at least one cutting fluid nozzle included in a cutting fluid supplying device for supplying the cutting fluid to a machining region of a machine tool for machining a workpiece, the cutting fluid amount adjusting device comprising:

a data acquirer configured to acquire data comprising at least (i) data indicating a machining state by the machine tool and (ii) data relating to the cutting fluid supplied from the cutting fluid supplying device;

a preprocessor configured to create, based on the data acquired by the data acquirer, data used in machine learning; and a machine learning device configured to execute, based on the data created by the preprocessor, processing of the machine learning relating to the discharge amount of the cutting fluid from the cutting fluid nozzle under an environment in which machining of the workpiece by the machine tool is performed.

2. The cutting fluid amount adjusting device according to claim 1, wherein the preprocessor creates, as data used in supervised learning by the machine learning device, state data including at least tool data including information concerning a tool used in the machining of the workpiece by the machine tool, machining condition data including information concerning machining conditions in the machining of the workpiece by the machine tool, workpiece data including information concerning the workpiece machined by the machine tool, cutting fluid data including information concerning the cutting fluid supplied to the machining region of the machine tool by the cutting fluid supplying device, machining process data including information concerning a machining process of the workpiece by the machine tool, cutting fluid discharge position data including information concerning a discharge position of the cutting fluid by the cutting fluid nozzle, cutting fluid discharge amount data including an amount of the cutting fluid discharged from the cutting fluid nozzle included in the cutting fluid supplying device, and label data including at least discharge amount propriety data indicating propriety of the discharge amount of the cutting fluid discharged from the cutting fluid nozzle, wherein the machine learning device includes a learner configured to generate, based on the state data and the label data, (i) a learning model associating the machining state by the machine tool and (ii) a state of the cutting fluid supplied from the cutting fluid supplying device with the propriety of the discharge amount of the cutting fluid discharged from the cutting fluid nozzle.

3. The cutting fluid amount adjusting device according to claim 1, wherein the preprocessor creates, as data used in estimation by the machine learning device, state data including at least tool data including information concerning a tool used in the machining of the workpiece by the machine tool, machining condition data including information concerning machining conditions in the machining of the workpiece by the machine tool, workpiece data including information concerning the workpiece machined by the machine tool, cutting fluid data including information concerning the cutting fluid supplied to the machining region of the machine tool by the cutting fluid supplying device, machining process data including information concerning a machining process of the workpiece by the machine tool, cutting fluid discharge position data including information concerning a discharge position of the cutting fluid by the cutting fluid nozzle, and
cutting fluid discharge amount data including an amount of the cutting fluid discharged from the cutting fluid nozzle included in the cutting fluid supplying device, wherein the machine learning device includes:
a learning-model storage configured to store (i) a learning model associating the machining state by the machine tool and (ii) a state of the cutting fluid supplied from the cutting fluid supplying device with propriety of the discharge amount of the cutting fluid discharged from the cutting fluid nozzle; and
an estimator configured to estimate, based on the state data, the propriety of the discharge amount of the cutting fluid discharged from the cutting fluid nozzle using the learning model stored in the learning-model storage, and the cutting fluid amount adjusting device further comprises a discharge-amount determiner configured to search for a minimum discharge amount of the cutting fluid estimated as good by the estimator and determine the discharge amount of the cutting fluid obtained by the search as an amount of the cutting fluid discharged from the cutting fluid nozzle.

4. The cutting fluid amount adjusting device according to claim 1, wherein
the preprocessor creates, as data used in supervised learning by the machine learning device,
state data including at least tool data including information concerning a tool used in the machining of the workpiece by the machine tool,
machining condition data including information concerning machining conditions in the machining of the workpiece by the machine tool,
workpiece data including information concerning the workpiece machined by the machine tool,
cutting fluid data including information concerning the cutting fluid supplied to the machining region of the machine tool by the cutting fluid supplying device,
machining process data including information concerning a machining process of the workpiece by the machine tool,
cutting fluid discharge position data including information concerning a discharge position of the cutting fluid by the cutting fluid nozzle, and
label data including at least appropriate discharge amount data including an amount of the cutting fluid discharged from the cutting fluid nozzle, wherein the machine learning device includes a learner configured to generate, based on the state data and the label data, (i) a learning model associating the machining state by the machine tool and (ii) a state of the cutting fluid supplied from the cutting fluid supplying device with the discharge amount of the cutting fluid discharged from the cutting fluid nozzle.

5. The cutting fluid amount adjusting device according to claim 1, wherein
the preprocessor creates, as data used in estimation by the machine learning device,
state data containing at least tool data including information concerning a tool used in the machining of the workpiece by the machine tool,
machining condition data including information concerning machining conditions in the machining of the workpiece by the machine tool,
workpiece data including information concerning the workpiece machined by the machine tool,
cutting fluid data including information concerning the cutting fluid supplied to the machining region of the machine tool by the cutting fluid supplying device,
machining process data including information concerning a machining process of the workpiece by the machine tool, and
cutting fluid discharge position data including information concerning a discharge position of the cutting fluid by the cutting fluid nozzle, wherein the machine learning device includes:
a learning-model storage configured to store (i) a learning model associating the machining state by the machine tool and (ii) a state of the cutting fluid supplied from the cutting fluid supplying device with the discharge amount of the cutting fluid discharged from the cutting fluid nozzle; and
an estimator configured to estimate, based on the state data, an amount of the cutting fluid discharged from the cutting fluid nozzle using the learning model stored in the learning-model storage, and
the cutting fluid amount adjusting device further comprises a discharge-amount determiner configured to determine the amount of the cutting fluid discharged from the cutting fluid nozzle based on an estimation result of the estimator.

6. The cutting fluid amount adjusting device according to claim 1, wherein
the preprocessor creates, as data used in supervised learning by the machine learning device,
state data including at least tool data including information concerning a tool used in the machining of the workpiece by the machine tool,
machining condition data including information concerning machining conditions in the machining of the workpiece by the machine tool,
workpiece data including information concerning the workpiece machined by the machine tool, cutting fluid data including information concerning the cutting fluid supplied to the machining region of the machine tool by the cutting fluid supplying device,
machining process data including information concerning a machining process of the workpiece by the machine tool, cutting fluid discharge position data including information concerning a discharge position of the cutting fluid by the cutting fluid nozzle,
cutting fluid discharge amount data including an amount of the cutting fluid discharged from the cutting fluid nozzle included in the cutting fluid supplying device, and
label data including at least discharge amount propriety data indicating propriety of the discharge amount of the cutting fluid discharged from the cutting fluid nozzle, wherein
the machine learning device includes a learner including:
a first learner configured to generate, based on the state data and the label data, (i) a first learning model associating the machining state by the machine tool and (ii) a state of the cutting fluid supplied from the cutting fluid supplying device with the propriety of the discharge amount of the cutting fluid discharged from the cutting fluid nozzle; and
a second learner configured to generate, based on a result of estimation processing performed using the first learning model generated by the first learner, a second learning model associating the machining state by the machine tool and the state of the cutting fluid supplied from the cutting fluid supplying device with the discharge amount of the cutting fluid discharged from the cutting fluid nozzle.

7. The cutting fluid amount adjusting device according to claim 1, wherein
the preprocessor creates, as data used in reinforcement learning by the machine learning device,
state data including at least tool data including information concerning a tool used in the machining of the workpiece by the machine tool,
machining condition data including information concerning machining conditions in the machining of the workpiece by the machine tool,
workpiece data including information concerning the workpiece machined by the machine tool,
cutting fluid data including information concerning the cutting fluid supplied to the machining region of the machine tool by the cutting fluid supplying device,
machining process data including information concerning a machining process of the workpiece by the machine tool,
cutting fluid discharge position data including information concerning a discharge position of the cutting fluid by the cutting fluid nozzle,
cutting fluid discharge amount data including an amount of the cutting fluid discharged from the cutting fluid nozzle included in the cutting fluid supplying device, and
determination data including at least discharge amount determination data for determining the discharge amount of the cutting fluid discharged from the cutting fluid nozzle and workpiece state determination data for determining a state of the workpiece, wherein
the machine learning device includes:
a learner configured to generate, based on the state data and the determination data, (i) a learning model associating the machining state by the machine tool and (ii) a state of the cutting fluid supplied from the cutting fluid supplying device with an adjusting behavior for the discharge amount of the cutting fluid discharged from the cutting fluid nozzle; and
a decision maker configured to determine, based on the state data, adjustment of the discharge amount of the cutting fluid discharged from the cutting fluid nozzle performed using the learning model generated by the learner, and
the cutting fluid amount adjusting device further comprises a discharge-amount determiner configured to determine, based on the determination of the decision maker, the amount of the cutting fluid discharged from the cutting fluid nozzle.

8. A system in which a plurality of devices are connected to one another via a network,
the plurality of devices comprising
a first cutting fluid amount adjusting device configured to adjust a discharge amount of cutting fluid from at least one cutting fluid nozzle included in a cutting fluid supplying device supplying the cutting fluid to a machining region of a machine tool that machines a workpiece, the first cutting fluid amount adjusting device including:
a data acquirer configured to acquire at least data indicating a machining state by the machine tool and data relating to the cutting fluid supplied from the cutting fluid supplying device;
a preprocessor configured to create, based on the data acquired by the data acquirer, data used in machine learning; and
a machine learning device configured to execute, based on the data created by the preprocessor, processing of the machine learning relating to the discharge amount of the cutting fluid from the cutting fluid nozzle in an environment in which machining of the workpiece by the machine tool is performed, wherein
the preprocessor creates, as data used in supervised learning by the machine learning device,
state data containing at least tool data including information concerning a tool used in the machining of the workpiece by the machine tool,
machining condition data including information concerning machining conditions in the machining of the workpiece by the machine tool,
workpiece data including information concerning the workpiece machined by the machine tool,
cutting fluid data including information concerning the cutting fluid supplied to the machining region of the machine tool by the cutting fluid supplying device,
machining process data including information concerning a machining process of the workpiece by the machine tool,
cutting fluid discharge position data including information concerning a discharge position of the cutting fluid by the cutting fluid nozzle,
cutting fluid discharge amount data including an amount of the cutting fluid discharged from the cutting fluid nozzle included in the cutting fluid supplying device, and
label data containing at least discharge amount propriety data indicating propriety of the discharge amount of the cutting fluid discharged from the cutting fluid nozzle, wherein
the machine learning device includes a learner configured to generate, based on the state data and the label data, (i) a learning model associating the machining state by the machine tool and (ii) a state of the cutting fluid supplied from the cutting fluid supplying device with the propriety of the discharge amount of the cutting fluid discharged from the cutting fluid nozzle.

9. The cutting fluid amount adjusting system according to claim 8, wherein
the plurality of devices comprise a computer including the machine learning device, the computer acquires at least one learning model generated by the learning in the learner of the first cutting fluid amount adjusting device; and
the machine learning device included in the computer performs optimization and streamlining based on the acquired learning model.

10. The cutting fluid amount adjusting system according to claim 8, wherein
the plurality of devices comprise a second cutting fluid amount adjusting device different from the first cutting fluid amount adjusting device; and
a learning result by the learner included in the first cutting fluid amount adjusting device is shared by the second cutting fluid amount adjusting device.

11. The cutting fluid amount adjusting system according to claim 8, wherein
the plurality of devices comprise a second cutting fluid amount adjusting device different from the first cutting fluid amount adjusting device; and data observed in the second cutting fluid amount adjusting device is usable in the learning by the learner included in the first cutting fluid amount adjusting device via the network.

12. A system in which a plurality of devices are connected to one another via a network, the plurality of devices comprising a first cutting fluid amount adjusting device configured to adjust a discharge amount of cutting fluid from at least one cutting fluid nozzle included in a cutting fluid supplying device for supplying the cutting fluid to a machining region of a machine tool that machines a workpiece, the first cutting fluid amount adjusting device including:
a data acquirer configured to acquire at least data indicating a machining state by the machine tool and data relating to the cutting fluid supplied from the cutting fluid supplying device;
a preprocessor configured to create, based on the data acquired by the data acquirer, data used in machine learning; and
a machine learning device configured to execute, based on the data created by the preprocessor, processing of the machine learning relating to the discharge amount of the cutting fluid from the cutting fluid nozzle in an environment in which machining of the workpiece by the machine tool is performed, wherein
the preprocessor creates, as data used in supervised learning by the machine learning device,
state data containing at least tool data including information concerning a tool used in the machining of the workpiece by the machine tool,
machining condition data including information concerning machining conditions in the machining of the workpiece by the machine tool,
workpiece data including information concerning the workpiece machined by the machine tool,
cutting fluid data including information concerning the cutting fluid supplied to the machining region of the machine tool by the cutting fluid supplying device,
machining process data including information concerning a machining process of the workpiece by the machine tool and cutting fluid discharge position data including information concerning a discharge position of the cutting fluid by the cutting fluid nozzle and label data containing at least appropriate discharge amount data including an amount of the cutting fluid discharged from the cutting fluid nozzle, and the machine learning device includes a learner configured to generate, based on the state data and the label data, (i) a learning model associating the machining state by the machine tool and (ii) a state of the cutting fluid supplied from the cutting fluid supplying device with the discharge amount of the cutting fluid discharged from the cutting fluid nozzle.

13. The cutting fluid amount adjusting system according to claim 12, wherein the plurality of devices comprise a computer including the machine learning device, the computer acquires at least one learning model generated by the learning in the learner of the first cutting fluid amount adjusting device; and the machine learning device included in the computer performs optimization and streamlining based on the acquired learning model.

14. The cutting fluid amount adjusting system according to claim 12, wherein the plurality of devices comprise a second cutting fluid amount adjusting device different from the first cutting fluid amount adjusting device; and a learning result by the learner included in the first cutting fluid amount adjusting device is shared with the second cutting fluid amount adjusting device.

15. The cutting fluid amount adjusting system according to claim 13, wherein the plurality of devices comprise a second cutting fluid amount adjusting device different from the first cutting fluid amount adjusting device; and data observed in the second cutting fluid amount adjusting device is usable in the learning by the learner included in the first cutting fluid amount adjusting device via the network.

* * * * *